United States Patent
Nims et al.

(10) Patent No.: US 10,033,990 B2
(45) Date of Patent: *Jul. 24, 2018

(54) DIGITAL MULTI-DIMENSIONAL IMAGE PHOTON PLATFORM SYSTEM AND METHODS OF USE

(71) Applicants: Jerry Nims, Sandy Springs, GA (US); William M. Karszes, Hilton Head Island, SC (US); Samuel Pol, Lawrenceville, GA (US)

(72) Inventors: Jerry Nims, Sandy Springs, GA (US); William M. Karszes, Hilton Head Island, SC (US); Samuel Pol, Lawrenceville, GA (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/841,833

(22) Filed: Sep. 1, 2015

(65) Prior Publication Data
US 2016/0227185 A1    Aug. 4, 2016

Related U.S. Application Data

(63) Continuation-in-part of application No. 14/609,772, filed on Jan. 30, 2015.

(51) Int. Cl.
*H04N 13/00* (2018.01)
*H04N 13/02* (2006.01)
(Continued)

(52) U.S. Cl.
CPC ..... *H04N 13/0404* (2013.01); *H04N 13/0022* (2013.01); *H04N 13/0029* (2013.01);
(Continued)

(58) Field of Classification Search
CPC ........... H04N 13/0018; H04N 13/0203; H04N 13/026; H04N 13/0409; H04M 3/06; B33Y 40/00
(Continued)

(56) References Cited

U.S. PATENT DOCUMENTS

| 5,796,373 A | 8/1998 | Ming-Yen | |
| 2009/0195643 A1* | 8/2009 | Neuman ............ | H04N 13/0459 348/51 |

FOREIGN PATENT DOCUMENTS

| KR | 20120040386 | 4/2012 |
| WO | 2002011070 | 2/2002 |

(Continued)

OTHER PUBLICATIONS

International Search Authority, "International Search Report and Written Opinion", PCT/US16/049904, dated Nov. 10, 2016.

*Primary Examiner* — Hee-Yong Kim
(74) *Attorney, Agent, or Firm* — Mathew L. Grell; Jeffrey Watson; Grell & Watson Patent Attorneys LLC

(57) ABSTRACT

A systematic approach to producing multi-dimensional photon images on a computer platform having applications to a plurality of input image(s) from various sources, and applications to coordinate and adjust numerous variables which determine the quality of the image, such as the size of the imported images, the output image size, the resolving power of the viewing screen and the width of the resolving elements, the dots per inch of the output device (or pixels per inch), the desired nearest object, the desired furthest object and the determination of the central or the "key subject", rules of interphasing, the number of frames or layers, the minimum parallax, and the maximum parallax, and, thus, provide a digital multi-dimensional image without jumping images or fuzzy features or other visual distortions by creating high quality output images both in the form of a printed hardcopy or as a viewed image on an appropriate viewing device. The digital multi-dimensional image platform based system controls the position and path of light from the original object to the human visual system.

21 Claims, 18 Drawing Sheets

(51) Int. Cl.
  *H04N 13/04*   (2006.01)
  *G06T 17/00*   (2006.01)
(52) U.S. Cl.
  CPC . *H04N 13/0037* (2013.01); *H04N 2013/0081* (2013.01); *H04N 2213/007* (2013.01)
(58) Field of Classification Search
  USPC .......................................................... 348/43
  See application file for complete search history.

(56) References Cited

FOREIGN PATENT DOCUMENTS

| | | |
|---|---|---|
| WO | 2002013143 | 2/2002 |
| WO | 2009032088 A1 | 3/2009 |
| WO | 2016120719 | 8/2016 |

\* cited by examiner

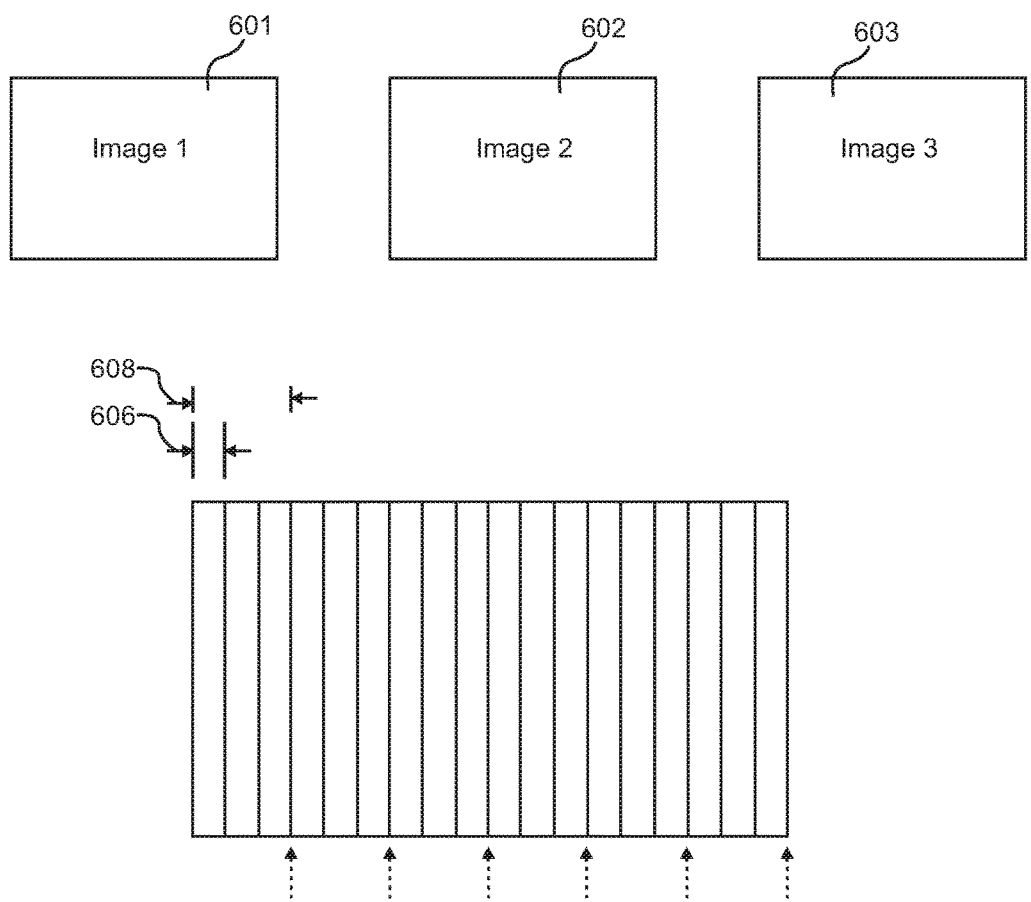
Fig. 6.1

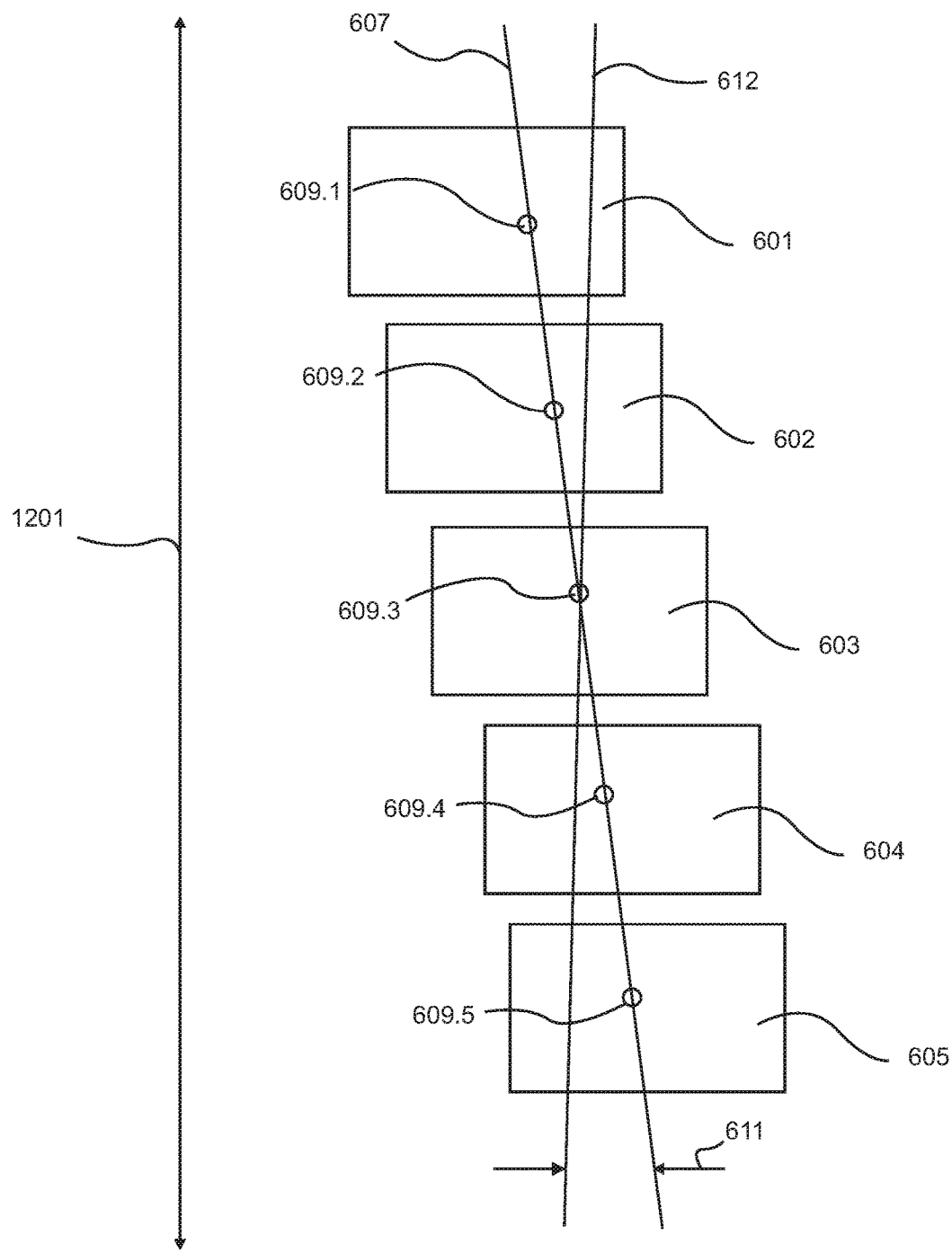
Fig. 6.2

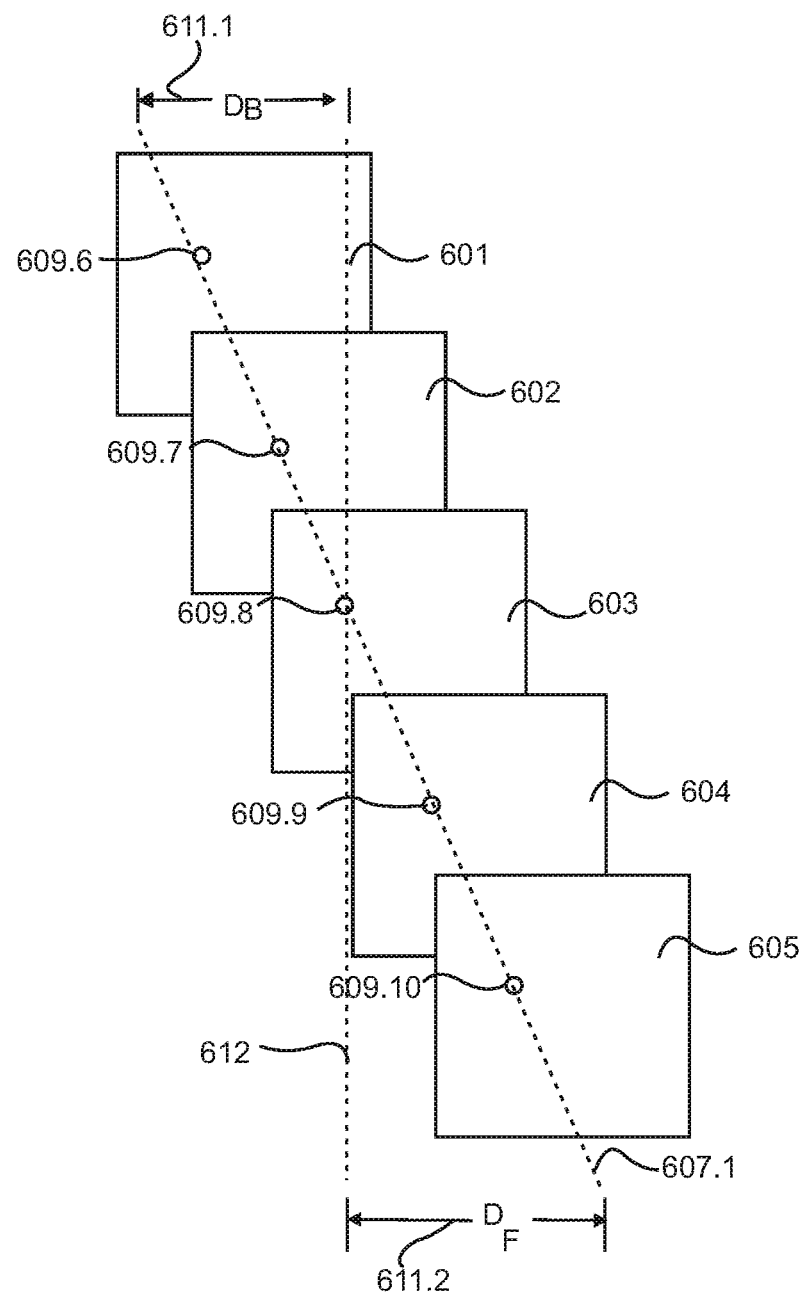
Fig. 6.3

| Output DPI Max (R) | Proposed LPI (L) | Frame Count (F) | Pixels per Lencicule | Pixels per Frame (M) |
|---|---|---|---|---|
| 2400 | 100 | 24 | 24 | 1 |
| 1200 | 100 | 12 | 24 | 2 |
| 600 | 100 | 6 | 24 | 4 |
| 300 | 100 | 3 | 24 | 8 |

| Frames (F) | Input DPI (D) | Parallax (P) | | Adjusted | Move/Pixel (K) |
|---|---|---|---|---|---|
| 12 | 300 | 0.040 | P Min | 0.052 | 1 |
| | | 0.080 | P Int | 0.092 | 2 |
| | | 0.120 | P Max | 0.132 | 3 |
| | | 0.160 | | 0.172 | 4 |
| | | 0.200 | | 0.212 | 5 |
| | | 0.240 | P Max + | 0.252 | 6 |
| | | 0.280 | | 0.292 | 7 |
| | | 0.320 | | 0.332 | 8 |
| | | 0.360 | P Max + | 0.412 | 9 |
| | | 0.400 | | 0.452 | 10 |
| | | 0.440 | | 0.492 | |
| | | 0.480 | P Max + | 0.520 | |
| | | 0.520 | | | |

704 → Frames; 710 → Parallax; 702; 706; 708 → P Max; 711

| (lens type) Ls | LPI (L) | Lenticule Width (W) | P Max | |
|---|---|---|---|---|
| Pacur 3D | 100 | 0.0101 | 0.12 | Optimum Parallax (P Max) |
| | 75 | 0.0133 | 0.16 | |
| | 60 | 0.0166 | 0.20 | |
| Orasee 3D | 40 | 0.0251 | 0.30 | |

| Art W | Resize Width | Resize | Frames | Paralax Adjust |
|---|---|---|---|---|
| 4.599 | 4.46 | 0.139 | 12 | 0.012 |
| Aw | Rw | Rs | F | Pa |

Fig. 7A

| PD | B | F | |
|---|---|---|---|
| Pixel Density | BPI | Frame count | Pixels per Frame |
| 188 | 94 | 2 | 2 |

| F | R | P | | K |
|---|---|---|---|---|
| Frame | Input DPI | Parallax | 702 | Move |
| 2 | 300 | 0.007 | P Min | 1 |
| | | 0.013 | P Int — 710 | 2 |
| | | 0.020 | P Max | 3 |
| | 704 | 0.027 | 706 | 4 |
| | | 0.033 | | 5 |
| | | 0.040 | P Max + | 6 |
| | | 0.047 | | 7 |
| | | 0.053 | | 8 |
| | | 0.060 | P Max + | 9 |
| | | 0.067 | | 10 |
| | | | | 711 |

| DT (Display type) | B BP | WB Barrier Width | 708 | |
|---|---|---|---|---|
| Neo3Do | 94 | 0.0106 | 0.02 | Optimum Parallax (P Max) |
| | | | | |
| | | | | |
| | | | | |
| | | | | |

Fig. 7B

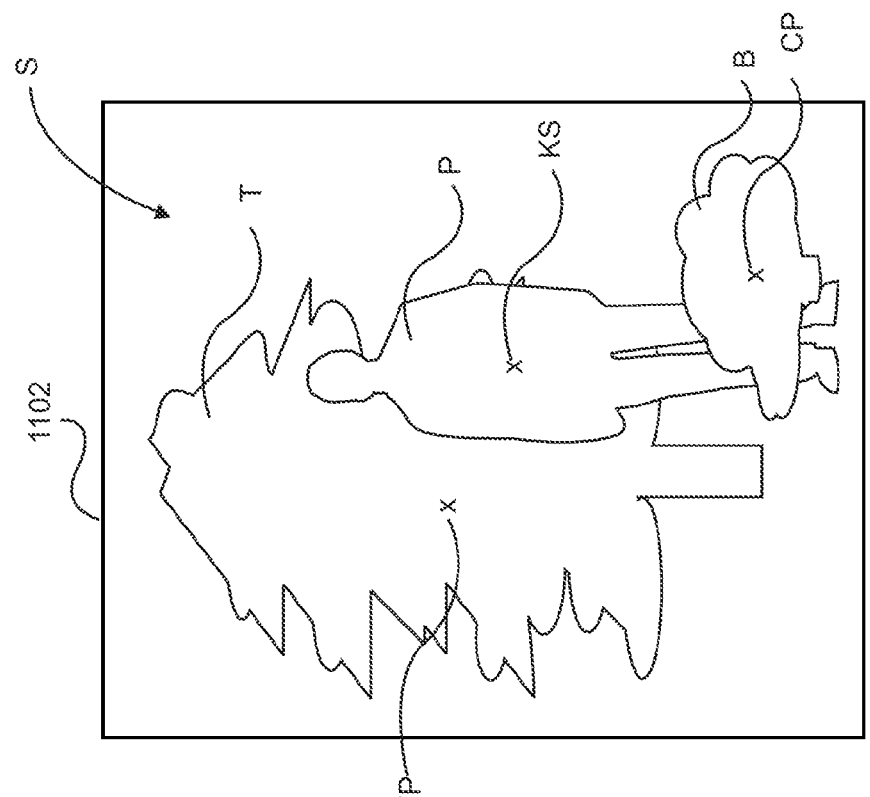
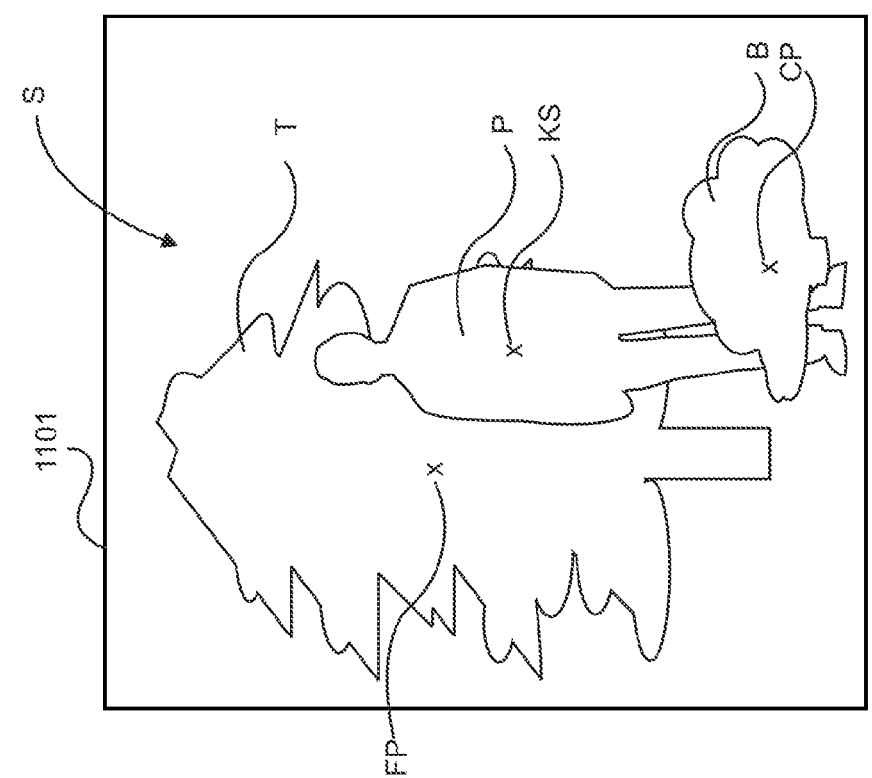
Fig. 11

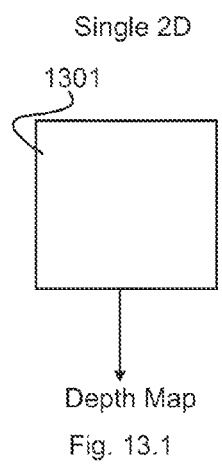
Single 2D
1301
Depth Map
Fig. 13.1
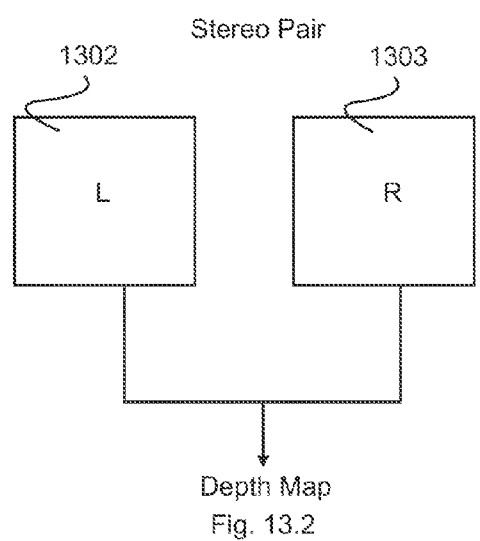
Stereo Pair
1302    1303
L    R
Depth Map
Fig. 13.2
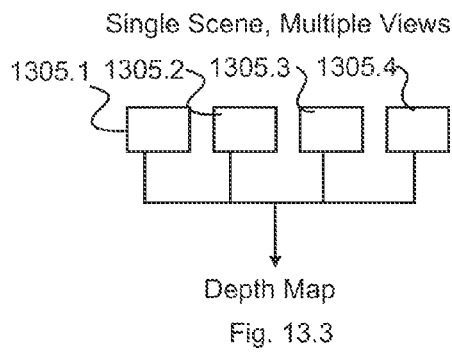
Single Scene, Multiple Views
1305.1 1305.2 1305.3 1305.4
Depth Map
Fig. 13.3
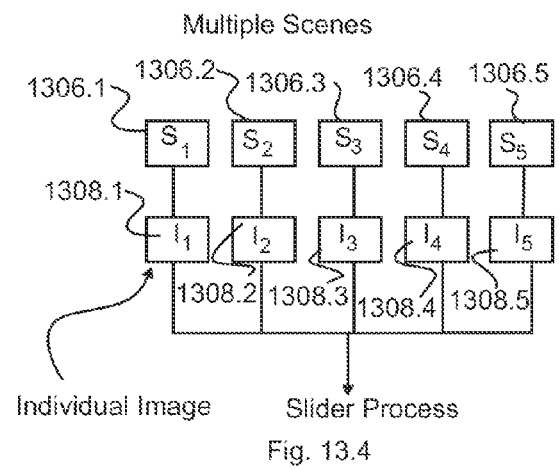
Multiple Scenes
1306.1 1306.2 1306.3 1306.4 1306.5
$S_1$ $S_2$ $S_3$ $S_4$ $S_5$
1308.1
$I_1$ $I_2$ $I_3$ $I_4$ $I_5$
1308.2 1308.3 1308.4 1308.5
Individual Image    Slider Process
Fig. 13.4

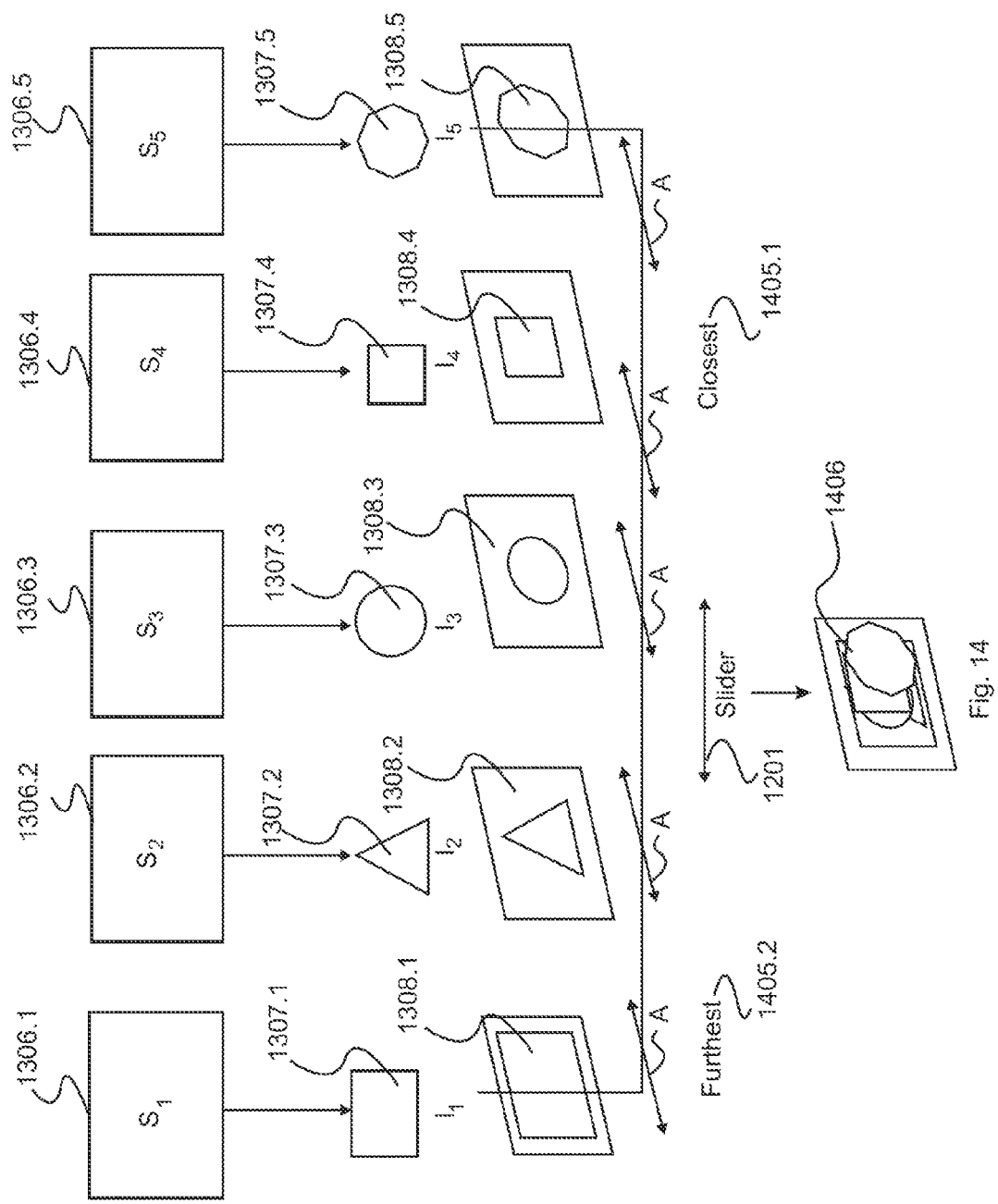

DIGITAL MULTI-DIMENSIONAL IMAGE PHOTON PLATFORM SYSTEM AND METHODS OF USE

CROSS REFERENCE TO RELATED APPLICATIONS

To the full extent permitted by law, the present United States Non-provisional patent application is a Continuation-in-Part of, and hereby claims priority to and the full benefit of, United States Non-provisional application entitled "Digital Multi-Dimensional Image Photon Platform System And Methods Of Use," having assigned Ser. No. 14/609,772, filed on Jan. 30, 2015, incorporated herein by reference in its entirety.

TECHNICAL FIELD

The disclosure relates generally to image transformation and, more specifically, to image transformation and processing to produce consistently high quality three dimensional and other multi-dimensional images.

BACKGROUND

Traditional analog three dimensional images up to the age of the computer were produced using multi-lens cameras. The resulting negatives were printed on photo-emulsions. The result was either viewed and saved or scanned and digitized for printing on a lenticular screen. These images were produced by printing separate frames of the same image behind each lens. The individual frames were offset by an operator independently adjusting the depths of field relative to a central object in a central frame.

Analog Photography Techniques

Analog photography techniques for taking and methods of composing stereoscopic pictures employing a lenticular lens and controlling depth of field are set forth in U.S. Pat. No. 3,960,563 entitled Methods and Apparatus for Taking and Composing Stereoscopic Pictures, U.S. Pat. No. 4,086,585 entitled System and Camera for Controlling Depth of Field in Three-dimensional Photography, U.S. Pat. No. 4,124,291 entitled Control of Depth of Field in Three Dimensional Photography, U.S. Pat. No. 3,895,867 entitled Three Dimensional Pictures and Method of Composing Them, and U.S. Pat. No. 4,059,354 entitled Stereoscopic Photograph Composition Apparatus.

Micro Optical Material (M.O.M.)

Improvements in methods, process and apparatus for making and forming lenticular plastic sheets, foils, and lenticular-coated substrates are set forth in U.S. Pat. No. 5,362,351 entitled Method of Making Lenticular Plastics and Products Therefrom, and U.S. Pat. No. 6,060,003 entitled Method and Apparatus for Making Lenticular Plastic. It is recognized that Micro Optical Material (M.O.M.) brand lens material is preferred for application of the methods disclosed herein.

3D Printing

Improvements in methods, process and apparatus for printing on lenticular sheets are set forth in U.S. Pat. No. 6,709,080 entitled Method and Apparatus for Direct Printing on a Lenticular Foil, and U.S. Pat. No. 8,136,938 entitled System and Method for Printing on Lenticular Sheets.

The above listed patents relate to the analog (silver halide or ink to plastic direct printing) process for making a substrate to reproduce or print an analog image on lenticular sheet or foil. During the interphase step, under these patents, an operator could pick a key subject frame within the picture. Then the multiple frames were scanned/exposed into the lenticular medium (with silver halide coating). By scanning/exposing through the lenticular screen a number of the image errors due to manufacturing were eliminated by the lenticular material. Moreover, the image that was scanned in would look exceptional since errors were compensated for because the light path in and out was accounted for in the lenticular material.

With the advent of computers with higher processing speeds, large RAM and storage provides a hardware platform for the generation of digital multi-dimensional images that can be printed or viewed directly on a viewing screen designed to accept the appropriate digital multidimensional image. The digital multidimensional images may be viewed using barrier screens or lens arrays, such as micro-optical material (MOM).

Image System

Previous methods for digitally generating images for display through lenticular media are set forth in U.S. Pat. No. 6,760,021 entitled Multi-dimensional Image System for Digital Image Input and Output, U.S. Pat. No. 7,019,865 entitled Method for Scaling and Interlacing Multidimensional and Motion Images, and U.S. Pat. No. 7,639,838 entitled Multi-dimensional Images System for Digital Image Input and Output.

However, viewing of the resulting digital multidimensional images in the above listed methods can present problems due to alignment of the image to the barrier screens or lens arrays. Misalignment results in jumping images, out of focus, or fuzzy features when viewing the digital multidimensional images. The viewing of these images can lead to headaches and nausea.

One disadvantage of this approach is that lenticular image design is limited in that it relies on a lenticular "artist" to compose by visual trial and error. This process involves experimentation to find the best combination of parameters to make a lenticular image look right to the human visual system. However, this traditional process accounts for only a few of the possible parameters. The adjustments currently used are manual at best. Parallax is judged by the human visual system selecting values based on what looks correct. Using manual and artistic calibrations limits accuracy and reduces the lenticular image three dimensional and/or motion effect.

Moreover, another disadvantage of this approach is that double images occur and are usually caused by an exaggeration of the three dimensional effect from angles of view or an insufficient number of frames. Poor composition can lead to doubling, small jumps, a fuzzy image, or where foreground and background are fuzzy or shaded, especially on objects in relief or in depth.

Still another disadvantage of this approach is that ghosting occurs due to poor treatment of the source images, and also due to transitions where demand for an effect goes beyond the limits and technical possibilities of the system. This causes images to remain visible when they should disappear.

Certain of the above listed patents relate to a system for digital interphasing. During the interphase step, under these patents, an operator could pick the key subject as a frame but not as a point and in addition the parallax is not calculated. Here the interphase step was performed by the computer; however, errors from the lenticular material and manufacturing processes were not compensated for during the interphase step.

Therefore, it is readily apparent that there is a recognizable unmet need for a digital multi-dimensional photon image platform system and methods of use. The methods and system perform the appropriate functions to compose digital multidimensional images that are sharply focused and free of jumping images or fuzzy features. The methods and system unify variables from the precise production of the micro-optical material, output device, to the rule of interphasing around a key subject point within a calculated parallax (minimum and maximum), and to the control of the parallax relative to the micro-optical material or other viewing screens. Careful attention to these variables is basic to the production of high quality output images both in the form of a printed hardcopy or as a viewed multidimensional image on an appropriate viewing device(s). Images produced by the methods or system are pleasing to the eye by matching the psychological and physiological requirements of the human visual system.

BRIEF SUMMARY

Briefly described, in example embodiment, the present system and methods overcome the above-mentioned disadvantages and meet the recognized need for a digital multi-dimensional photon image platform system and methods of use, including, in general, a systematic approach to multi-dimensional image creation based on a computer platform having applications to input image(s) from various sources, and applications to coordinate and adjust numerous variables which determine the quality of the multi-dimensional image, such as the size of the imported images, the output image size, the resolving power of the viewing screen and the width of the resolving elements, the dots per inch of the output device (or pixels per inch) the desired nearest object (closest point), the desired furthest object (furthest point) and the determination of the central or the "key subject point", the rules of interphasing, the number of frames, and the calculation of parallax (the minimum parallax and the maximum parallax), and, thus, provide a sharply focused digital multi-dimensional image without jumping images or fuzzy features by creating high quality output images either in the form of a printed hardcopy or as a viewed image on an appropriate viewing device.

According to its major aspects and broadly stated, the digital multi-dimensional photon image platform system and methods of use include, in general, a system or platform to create a digital multi-dimensional image, wherein the system utilizes a computer processor running software, the system includes inputting a 2D source scene or a stereo pair to the computer processor, the computer processor performing the following operations: the system converts the 2D source scene into at least a left digital image and at least a right digital image. For a stereo pair, the system labels the left and right image. The system enables selection of a key subject point in the at least left digital image and at least right digital image and assigns an intermediate gray scale number approximate mid-point of the scale. The system enables selection of a closest point in the at least left digital image and at least right digital image and assigns a gray scale value of a start number, the system enables selection of a furthest point in the at least left digital image and at least right digital image and assigns a gray scale value of an end number, the system interpolates intermediate points based on the assigned points (closest point, key subject point, and furthest point), the system assigns values to those intermediate points and renders the sum to a gray scale depth map, the system enables inputting of digital image parameters, the system calculates a frame number, a minimum parallax, and a maximum parallax based on the digital output image parameters, the system generates a plurality of image frames between the closest point and furthest point based on the calculated frame number and the plurality of image frames are configured to the key subject within the minimum calculated parallax and a maximum calculated parallax, and the system interphases columns of pixels of the plurality of image frames via an interphasing algorithm to generate a digital multidimensional master image with the individual frames aligned in the master image tuned to the chosen output device.

According to its additional major aspects and broadly stated, the digital multi-dimensional photon image platform system and methods of use include, in general, a system or platform to create a digital multi-dimensional image, wherein the system utilizes a computer processor running software, the system includes inputting multiple views of a single scene or differing scenes from which different images are extracted, the computer processor performing the following operations: in the case of multi views from a single image, the views are ordered relative to the angle from which they were taken; in the case of different scenes, the appropriate images are extracted from the differing scenes and layered relative to one another. The images in either case are adjusted relative to one another through a slider process. The slider represents the total parallax calculated while the key subject point is chosen close to the center. The images are then used to create a depth map in the following manner. The system enables selection of a key subject point in the image closest to the center of the array, and a value is assigned to the key subject which is approximately one half the gray scale being used by the system. The system enables selection of a closest point in the image assigned to the closest image in the slider process. This is assigned the lowest value in the gray scale being utilized. The system enables selection of a furthest point in the image from the furthest image of the slider process and assigns a gray scale value of an end number. The system interpolates intermediate points based on the assigned points (closest point, key subject point, and furthest point) and assigns values to those intermediate points and renders the sum to a gray scale depth map. The system enables inputting of digital image parameters, the system calculates a frame number, a minimum parallax, and a maximum parallax based on the digital output image parameters. The system generates a plurality of image frames between the closest point and furthest point based on the calculated frame number and the plurality of image frames are configured to the key subject within the minimum calculated parallax and a maximum calculated parallax. The system interphases columns of pixels of the plurality of image frames via an interphasing algorithm to generate a digital multidimensional master image with the individual frames aligned in the master image tuned to the chosen output device. The minimum number of frames is two, producing a stereo pair.

In a further embodiment a method for generating a multidimensional master digital image from at least one two dimensional digital source image, the method utilizing a computer processor executing an instruction, the method comprising, inputting at least one two dimensional digital source image of at least one scene to the processor, based on the at least one two dimensional digital source image, providing at least one left digital image and at least one right digital image, selecting a closest point in each of the left and right digital images and assigning the closest point a gray scale value of a start number, selecting a furthest point in each of the left and right digital images and assigning the furthest point a gray scale value of an end number, selecting a key subject point in each of the left and right digital images and assigning the key subject point a gray scale value of an intermediate number, inputting a number of gray scale digital image layers of the left and right digital images to be utilized in generating the multidimensional master digital image, generating from at least the assigned gray scale values a depth map having the number of gray scale digital image layers, including a layer for at least each of the closest point, the key subject point and the furthest point, inputting a calculated range of a set of useable parallax values in the gray scale digital image layers, the calculated range including at least a minimum parallax value and at least a maximum parallax value, the set of useable parallax values being based on a gray scale image layer number and at least one other digital image parameter, configuring the gray scale digital image layers such that (1) each of the key subject points therein is aligned, (2) the parallax value in the key subject point gray scale digital image layer is zero, and (3) the parallax value in each of the other gray scale digital image layers is within the calculated range of the useable parallax values, and interphasing columns of pixels of the gray scale digital image layers to generate a multidimensional master digital image of the at least one scene aligned to the key subject point.

In still a further embodiment a computer system to generating a multidimensional master digital image from at least one two dimensional digital source image, the computer system comprising, a memory device for storing an instruction, a processor in communication with the memory and configured to execute the instruction, the processor receives at least one two dimensional digital source image of at least one scene, the processor converts the digital source image to a left digital image and a right digital image, the processor displays the left digital image and the right digital image on a viewing screen, the processor executes an instruction to select a closest point in each of the left and right digital images and assign the closest point a gray scale value of a start number, selecting a furthest point in each of the left and right digital images and assign the furthest point a gray scale value of an end number, the processor executes an instruction to select a key subject point in each of the left and right digital images and assign the key subject point a gray scale value of an intermediate number, the processor executes an instruction to input a number of gray scale digital image layers of the left and right digital images to be utilized to generate the multidimensional master digital image, the processor executes an instruction to generate from at least the assigned gray scale values a depth map having the number of gray scale digital image layers, including a layer for at least each of the closest point, the key subject point and the furthest point, the processor executes an instruction to input a calculated range of a set of useable parallax values in the gray scale digital image layers, the calculated range including at least a minimum parallax value and at least a maximum parallax value, the set of useable parallax values being based on a gray scale image layer number and at least one other digital image parameter, the processor executes an instruction to configure the gray scale digital image layers such that (1) each of the key subject points therein is aligned, (2) the parallax value in the key subject point gray scale digital image layer is zero, and (3) the parallax value in each of the other gray scale digital image layers is within the calculated range of the useable parallax values, and the processor executes an instruction to interphase columns of pixels of the gray scale digital image layers to generate a multidimensional master digital image of the at least one scene aligned to the key subject point.

Another modality of the system includes using an interpolated gray scale map to generate volumetric parallax using values assigned to the different points (closest point, key subject point, and furthest point) in a scene. This modality also allows volumetric parallax or rounding to be assigned to singular objects within a scene.

Herein parallax and key subject reference point methods are precisely formulated for the given digital multi-dimensional images as related to the micro-optical material (MOM) designed to allow viewing or as needed by special viewing devices or other viewing configurations, such as barrier screen, overlays, waveguides or other viewing devices or printed on special inkjet, offset press, flexo press, laser ablation transfer, and other printing or mechanical impression devices. These two features, control of parallax (depth of field) and key subject point method, are central to the quality of the resultant images as described. A user interacting with the system is required to determine key subject point of the resultant images. The algorithms can be used to determine the nearest point (foreground), furthest point (background) or by the operator composing the image. The parallax is calculated using variables from the given output device.

According to its major aspects and broadly stated, the digital multi-dimensional image platform based system and methods of use, in general, controls the position and path of light from the original object to the human visual system. The digital multi-dimensional photon image platform system and methods of use utilize a new hardware and software system with parameters of the barrier screens, lenticular and/or waveguide to control the position and path of light. Controlling the photons which compose the light controls the position/path of the reflected light (photons) relative to what the eye sees. The method or system places pixels in a precise pattern sending the reflected photons to the observer. The human visual system registers the incoming photons and with its unique ability creates the visual effect from the multi-dimensional image. The digital multi-dimensional photon image platform system and methods of use uniquely ties the position and path (key subject and depth of field) such that the eye sees a high quality multi-dimensional image without fuzziness, doubling or irritating distortion.

In an exemplary embodiment of a computer system for executing an operation to generate a multidimensional digital image from a multitude of two dimensional digital source images the computer system including a memory device for storing an instruction and a processor in communication with the memory and configured to execute the instruction, the processor receives the two dimensional digital source images, the processor executes an instruction to convert the digital source images to at least a left digital image and a right digital image, the processor displays the left digital image and the right digital on a viewing screen, the processor executes an instruction to select a key subject point in the left digital image and the right digital image, the processor executes an instruction to select a closest point in the left digital image and the right digital image and assign the closest point a gray scale value of a start number, the processor executes an instruction to select a furthest point in the left digital image and the right digital image and assign the furthest point a gray scale value of an end number, and the processor executes an instruction to create a depth map using an internal algorithm. The processor then executes an instruction to input a parallax value between the minimum parallax value and up to the maximum value. The maximum parallax value is based on the output method of either viewing screen or printing and their given parameters. The processor operates a command to create a plurality of image frames from the depth map based on a frame number, and the image frames configured having a parallax value between the minimum parallax value and the maximum parallax value. Finally the processor operates a command to interphase columns of pixels of the plurality of image frames to generate the multidimensional digital master image using the key subject point to align the individual frames in the master image while controlling the "depth of field" by controlling the image adjustment within the calculated minimum and maximum parallax value.

The digital source images may be generated from a multitude of different devices and industries. Each of the different starting places represents a different application and ranges from digital photographs to computer generated images. The input consists of one of the following options: single 2D image, stereo pair, several images of the same scene taken at different angles, or images extracted from several different scenes. This is further described hereinafter in connection with FIG. 5 and items 13.1-13.4 in FIG. 13.

Accordingly, a feature of the digital multi-dimensional photon image platform system and methods of use is the ability to input 2D source scenes into multi-dimensional/multi-spectral images. The output image follows the rule of a "key subject point" maintained within an optimum parallax to maintain a clear and sharp image.

Another feature of the digital multi-dimensional image platform based system and methods of use is the ability to produce digital multi-dimensional images that can be viewed on viewing screens, such as mobile and stationary phones, smart phones (including iPhone), tablets, computers and/or special output devices, directly without 3D glasses.

Still another feature of the digital multi-dimensional image platform based system and methods of use is the ability to produce digital multi-dimensional images that can be downloaded to a special printer capable of producing the appropriate multi-dimensional hardcopy on a plastic sheet of micro-optical material (MOM) designed to allow viewing of the multi-dimensional image directly without glasses.

Still another feature of the digital multi-dimensional image platform based system and methods of use is the ability to produce digital multi-dimensional images that can be mass produced on a graphics press such as lithography or flexography or other printing options, including UV inkjet, laser ablation transfer and other mechanical impression devices. Printed images maybe used to produce products ranging from a single memory photo to a multi-million piece advertising campaign utilizing the multi-dimensional image on a package to a point of purchase poster.

Still another feature of the digital multi-dimensional image platform based system and methods of use is the ability to produce the highest quality digital multi-dimensional images without blurring or jumping or loss of focus. Control of the "key subject point" while maintaining an optimum parallax is paramount to produce the highest quality digital multi-dimensional images.

Yet another feature of the digital multi-dimensional image platform based system and methods of use is the ability to produce multi-dimensional images that can show three dimensional, volumetric parallax, and visual effect techniques such as flips, zoom or morphing as understood by one skilled in the art.

Yet another feature of the digital multi-dimensional photon image platform system and methods of use is the ability to provide a platform having one or more algorithms, each with a plurality of steps, including use of the key subject point in interphasing along with the control of the depth of field in order to create high quality computer images, and wherein the three dimensional depth of field (parallax) corresponds to the intended two dimensional depth of field.

Yet another feature of digital multi-dimensional photon image platform system and methods of use is the ability to overcome the above defects via system parameters to determine the amount of spread or parallax that can be resolved by the viewing system, since the parallax controls the depth of field and is one of the main causes of fuzzy images.

Yet another feature of digital multi-dimensional photon image platform system and methods of use is the ability to overcome the above defects via system parameters to determine the convergence point or key subject point, since the viewing of an image that has not been aligned to a key subject point causes confusion to the human visual system and results in blur and double images.

Yet another feature of digital multi-dimensional photon image platform system and methods of use is the ability to overcome the above defects via system parameters to utilize the pixel selective interphase processing, since this process allows one to sharpen images in certain areas of the image.

Yet another feature of the digital multi-dimensional photon image platform system and methods of use is the ability to control and optimize system parameters for micro-optical material (MOM) viewing and printing devices, lens geometry and image/interlacing parameters. Alternatively the parameters of a viewing screen can be used to optimize the digital image to the device. These parameters will form a basic formula to define an algorithm to calibrate each parameter so as to optimize digital multi-dimensional images.

Yet another feature of the digital multi-dimensional photon image platform system and methods of use is the ability to show how a digital multi-dimensional image platform can be created to work on images, to show how applications running on the platform are used to introduce the optical information to the platform, and to show how the platform calls out specific operations or applications to create a high quality digital multi-dimensional image.

Yet another feature of the digital multi-dimensional photon image platform system and methods of use is the ability to overcome problems in the creation of the image as well as putting together a systematic approach to the production of the final image. For example, utilizing key subject as a point and not as a frame, and more specifically positioning the key subject point at the midpoint of the depth map, or at a point no more than plus or minus fifteen percent (+/−15%) adjustment from the midpoint, improves production of the final image. This is in preferable relation to adjusting stereo pair images, for example, from a digital camera or stereo enabled mobile device. In addition, calculating a maximum parallax that is related to the output device parameters, such as printer DPI and micro-optical material (MOM) lens per inch or viewing screen barrier screen pitch and pixel density, and integration of this information into the image creation process improves production of the final image.

Yet another feature of the digital multi-dimensional photon image platform system and methods of use is to utilize a systematic approach for digital multi-dimensional image creation with inputs, calculations, and selections to simplify development of a high quality master digital multi-dimensional image, which controls manufacturing errors and reduces cross talk and distortion to provide a digital multi-dimensional image without jumping images or fuzzy features in the form of a printed hardcopy or as a viewed digital multi-dimensional image on an appropriate viewing device.

Yet another feature of the digital multi-dimensional photon image platform system and methods of use is to utilize input applications configured to input a left and right digital image from a variety of image sources. Once the images are input the process is the same independent of the input application.

Yet another feature of the digital multi-dimensional photon image platform system and methods of use is its ability to maintain a good quality image one must compose the scene or "object field" around a "key subject point" while maintaining a parallax between a minimum value and a maximum value and preferably at an optimum value. Thus the present invention maintains within the platform methods of maintaining this rule to produce clear and sharply focused images for digitally composed scenes.

Yet another feature of the digital multi-dimensional photon image platform system and methods of use is its ability to integrate the output variables of a viewing screen or variables of the printed medium for hard copy such that the rule of maintaining a focused "key subject point" at an optimum parallax for the finished image with the appropriate viewing medium is maintained.

Yet another feature of the digital multi-dimensional photon image platform system and methods of use is its ability to calculate the "depth of field" (parallax) and to compose the picture around a key subject point while maintaining the calculated "depth of field".

These and other features of the digital multi-dimensional photon image platform system and methods of use will become more apparent to one skilled in the art from the following Detailed Description of exemplary embodiments and Claims when read in light of the accompanying drawing Figures.

BRIEF DESCRIPTION OF THE DRAWINGS

The present digital multi-dimensional photon image platform system and methods of use will be better understood by reading the Detailed Description of exemplary embodiments with reference to the accompanying drawing figures, in which like reference numerals denote similar structure and refer to like elements throughout, and in which:

FIG. 6.1 is a diagram of an exemplary embodiment of pixel interphase processing of frames of an image;

FIG. 6.2 is a diagram of an exemplary embodiment of aligning key subject point of an image and illustrates how parallax is measured;

FIG. 6.3 is a diagram of an exemplary embodiment of offset key subject point of an image and illustrates how total parallax is measured;

FIG. 7A is a diagram of an exemplary embodiment of a user interface for calculating parameters such as frame number, and minimum and maximum parallax for viewing with a lenticular screen or obtaining a hardcopy on a lenticular screen;

FIG. 7B is a diagram of an exemplary embodiment of a user interface for calculating parameters for a barrier screen;

FIG. 11 is a diagram of an exemplary embodiment of frames, left view and right view, of the 2D digital image;

FIGS. 13.1, 13.2, 13.3, 13.4 are diagrams of exemplary embodiments of sources of 2D digital input images;

FIG. 14 is a is a flow diagram of a method of generating a multidimensional image from the 2D digital images shown in FIGS. 13.3 and 13.4 (either a series of views from the same scene or images from different scenes)

Figure 1:
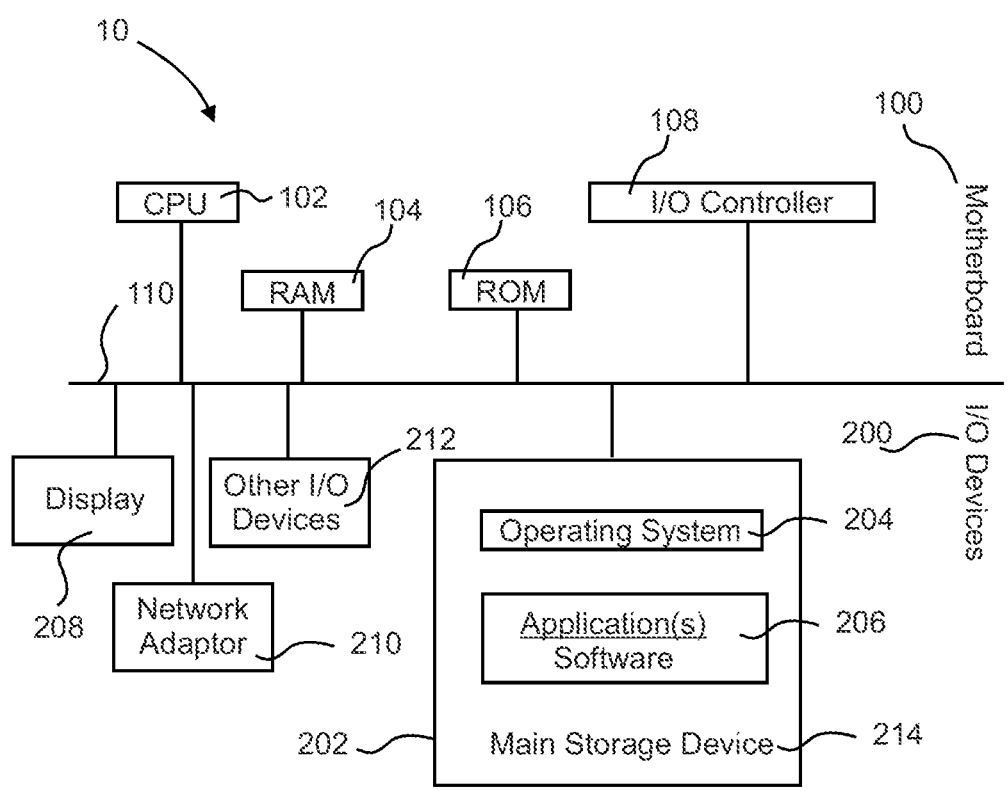
FIG. 1 is a block diagram of a computer system of the present disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-15, specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples.

In order to understand the present disclosure certain variables need to be defined. The object field is the entire image being composed. The "key subject point" is defined as the point where the scene converges, i.e., the point in the depth of field that always remains in focus and has no parallax differential in the key subject point frame. The foreground and background points are the closest point and furthest point from the viewer, respectively. The depth of field is the depth or distance created within the object field (depicted distance from foreground to background). The principal axis is the line perpendicular to the scene passing through the key subject point. The parallax is the displacement of the key subject point from the principal axis. In digital composition, the key subject point displacement from the principal axis between frames is always maintained as a whole integer number of pixels from the principal axis. The total parallax is the summation of the absolute value of the displacement of the key subject point from the principal axis in the closest frame and the absolute value of the displacement of the key subject point from the principal axis in the furthest frame.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object oriented programming languages, and other conventional programming language may be utilized without departing from the spirit and intent of the present disclosure.

Referring now to FIG. 1, there is illustrated a block diagram of a computer system 10 that provides a suitable environment for implementing embodiments of the present disclosure. The computer architecture shown in FIG. 1 is divided into two parts—motherboard 100 and the input/output (I/O) devices 200. Motherboard 100 preferably includes subsystems or processor to execute instructions such as central processing unit (CPU) 102, a memory device, such as random access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computer system 10 further preferably includes I/O devices 202, such as main storage device 214 for storing operating system 204 and instructions or application program(s) 206, and display 208 for visual output, and other I/O devices 212 as appropriate. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1 to be present to practice the present disclosure, as discussed below. Furthermore, the devices and subsystems may be interconnected in different configurations from that shown in FIG. 1, or may be based on optical or gate arrays, or some combination of these elements that is capable of responding to and executing instructions or operations. The operation of a computer system such as that shown in FIG. 1 is readily known in the art and is not discussed in further detail in this application, so as not to overcomplicate the present discussion.

Figure 2:
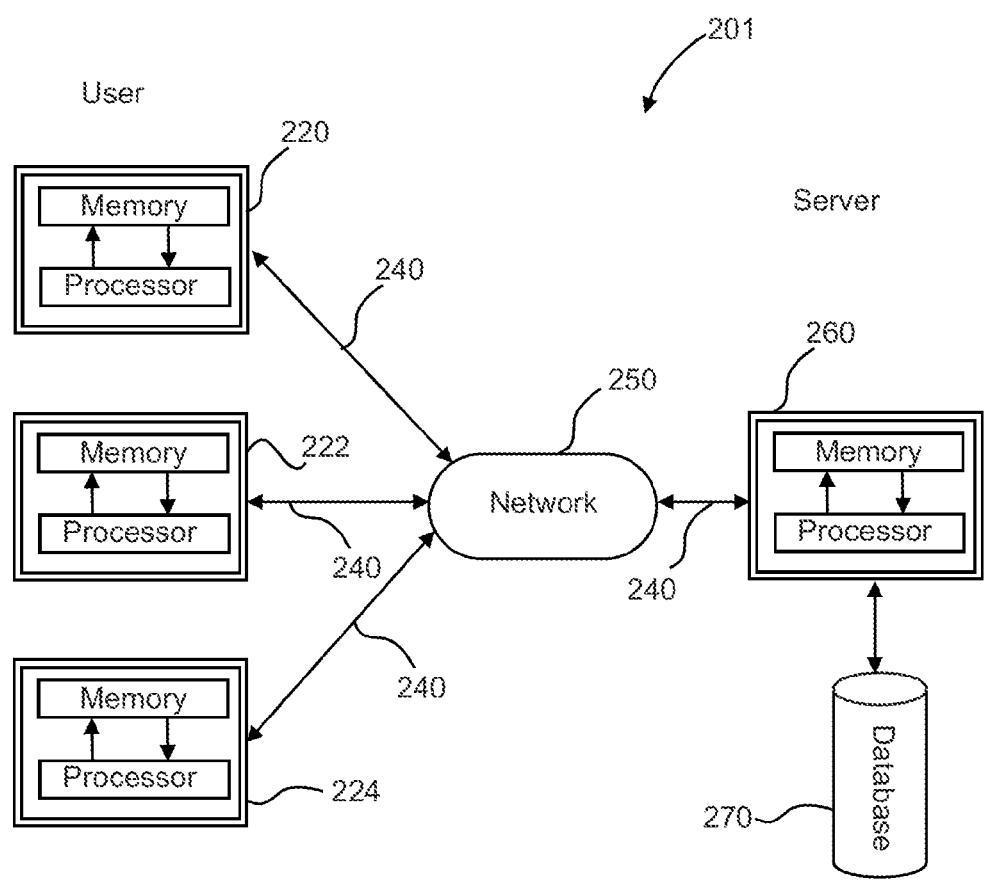
FIG. 2 is a block diagram of a communications system implemented by the computer system in FIG. 1.

Referring now to FIG. 2, there is illustrated a diagram depicting an exemplary communication system 201 in which concepts consistent with the present disclosure may be implemented. Examples of each element within the communication system 201 of FIG. 2 are broadly described above with respect to FIG. 1. In particular, the server system 260 and user system 220 have attributes similar to computer system 10 of FIG. 1 and illustrate one possible implementation of computer system 10. Communication system 201 preferably includes one or more user systems 220, 222, 224, one or more server system 260, and network 250, which could be, for example, the Internet, public network, private network or cloud. User systems 220-224 each preferably includes a computer-readable medium, such as random access memory, coupled to a processor. The processor, CPU 102, executes program instructions or operations stored in memory. Communication system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

Communications system 201 is capable of delivering and exchanging data between user system 220 and a server system 260 through communications link 240 and/or network 250. Through user system 220, users can preferably communicate over network 250 with each other user system 220, 222, 224, and with other systems and devices, such as server system 260, to electronically transmit, store, print and/or view multidimensional digital master image(s) 303 (see FIG. 3). Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, print and/or view multidimensional digital master image(s) 303. The communications link 240 may include, for example, a wired, wireless, cable, optical or satellite communication system or other pathway.

It is contemplated herein that RAM 104, main storage device 214, and database 270 may be referred to herein as storage device(s) or memory device(s).

Figure 3:
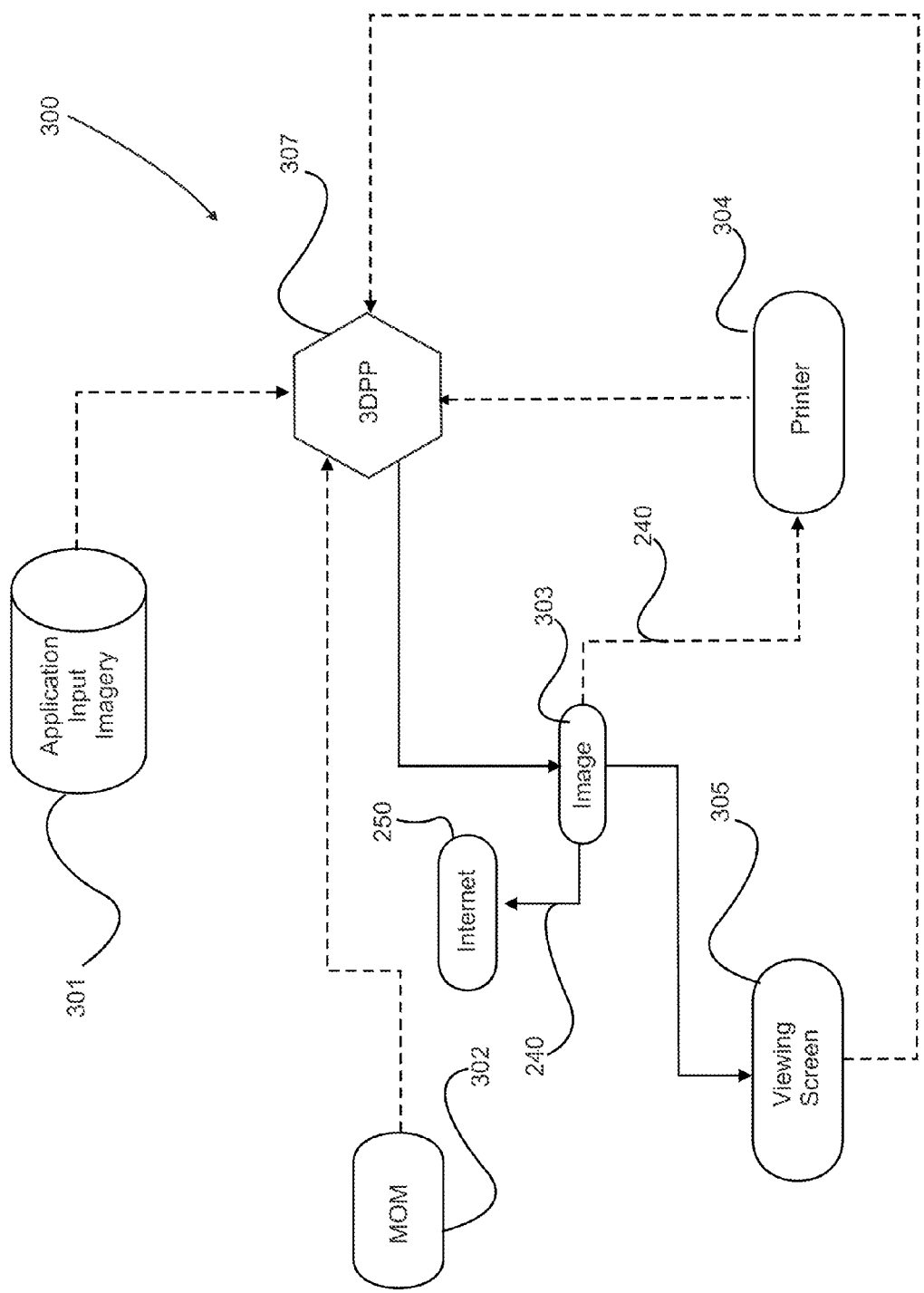
FIG. 3 is a block diagram of an exemplary embodiment of the digital multi-dimensional image platform.
Figure 5:
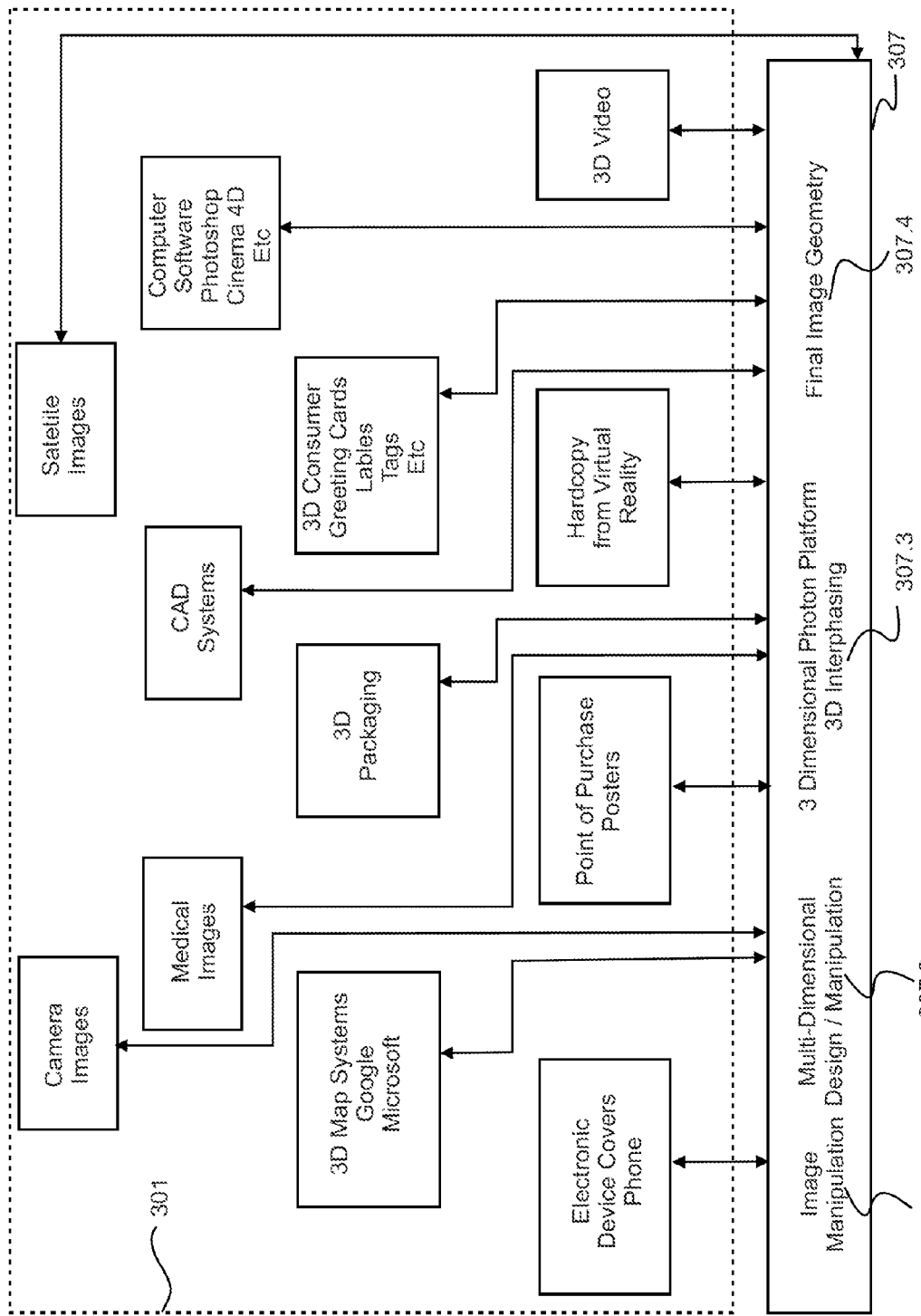
FIG. 5 is a block diagram of an exemplary embodiment of the digital multi-dimensional image platform shown in FIG. 3 with one or more input imagery applications.

Referring now to FIG. 3, by way of example, and not limitation, there is illustrated a block diagram of an exemplary embodiment of the digital multidimensional image platform 300. Preferably digital multidimensional image platform 300 includes multidimensional photon platform 307 configured as algorithm, software or applications 206 operating and/or executing instructions or operations on computer system 10, user system 220 and/or server system 260 (shown in FIGS. 1 and 2). Preferably multidimensional photon platform 307 is configured to receive: (1) one or more two dimensional digital source images of scene(s) S, i.e., 2D digital image(s), 2D digital scene or videos, such as scene(s) S, via image acquisition application 301 (which converts two dimensional digital scene S to digital source images (two dimensional digital source image), such as JPEG, GIF, TIF files from two dimensional digital scene S, (2) micro-optical material (MOM) 302 parameters, (3) printer 304 parameters, and/or (4) viewing screen 305 parameters or other input image parameters, and utilizes optimizing algorithm, software or applications 206 to reconfigure, edit, and/or reconstruct 2D digital images or scene S into multidimensional digital master image(s) 303 (or multidimensional master digital image). Preferably, starting 2D digital images or scenes S are input to computer system 10, user system 220 and/or server system 260 (shown in FIGS. 1 and 2) through image acquisition application 301. It is contemplated herein that scenes S may include a plurality of visible objects, subjects or points. Moreover, image acquisition application 301 may include different applications for different fields, industries, and/or image sources as shown in FIG. 5. Preferably, digital multidimensional image platform 300 utilizes applications 206 operating and/or executing instructions or operations on computer system 10, user system 220 and/or server system 260 (shown in FIGS. 1 and 2) to control the key subject point and the depth of field parameters of a 2D digital image or scenes S input through image acquisition application 301 and account for, design, and/or control the interrelationship of multidimensional digital master image(s) 303 to the selected output device, such as display 208, (e.g., viewing screen 305 whether implemented on a smart phone, PDA, monitor, laptop, TV, tablet, billboard, or other viewing device having stereo enabled viewing, via parallax barrier, barrier screen, overlays, waveguides or other viewing technology, capable of projecting information in a pixel format) or printer 304 (e.g., consumer printer, store kiosk, special printer or other hard copy device) to print multidimensional digital master image(s) 303 on, for example, lenticular or other physical viewing material. Digital multidimensional image platform 300 may transmit multidimensional digital master image(s) 303 via communications link 240 and network 250 to other computer system(s) 10, user system(s) 220 and/or server system(s) 260 (shown in FIGS. 1 and 2), viewing screen 305, and/or printer 304, whether local or in remote locations from each other.

It is also contemplated herein that viewing screen 305 may include technology such as barrier screen, film overlays (GRilli3D at www.grilli3d.com), dynamic barrier screens, and waveguides or other viewing devices to enable viewing of multidimensional digital master image(s) 303.

Figure 4:
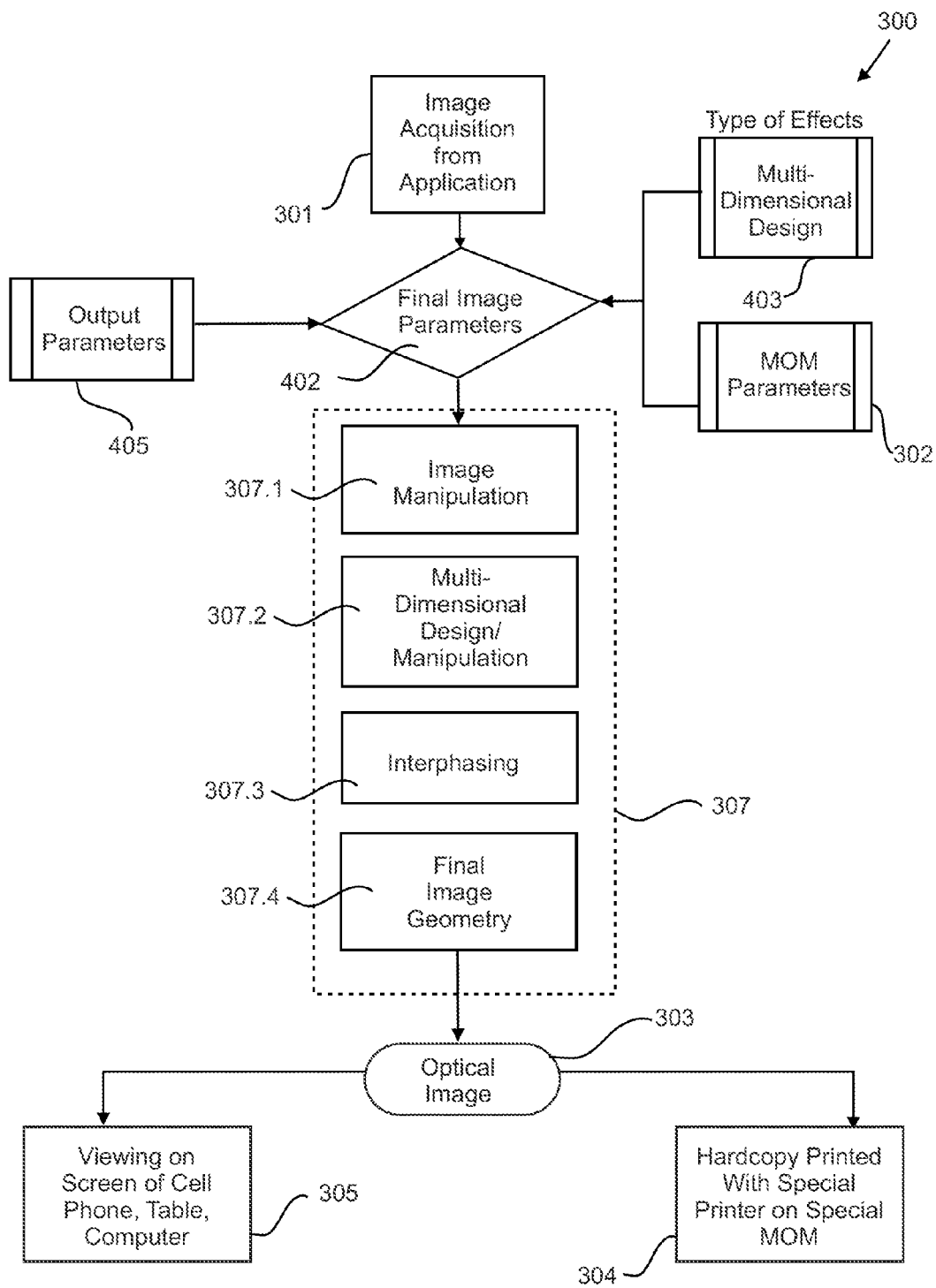
FIG. 4 is an expanded flow diagram of an exemplary embodiment of the digital multi-dimensional image platform shown in FIG. 3.

Referring now to FIG. 4, by way of example, and not limitation, there is illustrated a flow diagram of an exemplary embodiment of the digital multidimensional image platform 300. Preferably multidimensional photon platform 307 is configured to receive, collect, and utilize a collection of final image parameters 402 (profile format used for transforming the digital image and color data created on one device into the digital image and color values of a target output device). Inputs may include: (1) image acquisition application 301, which may include pixel data (smallest addressable element or resolution in a digital image capture device, viewing screen, or hardcopy printer device), type of image (finished image), computer generated image, combinations thereof, and the like; (2) digital image parameters, including output parameters 405, which may include output DPI (dots/inch—a measure of spatial printing or video dot density or sharpness, in particular the number of individual dots that can be placed in a line within the span of 1 inch), pixel size (size of each individual pixel); (3) color profile (a set of data and parameters that characterizes a color input or output device according to a standard known as digital image parameters); (4) output profile (a set of data and parameters that characterizes an output device); (5) type of effect 403 (which may include photo and video effects for digital image(s) and multidimensional design, digital effects, such as, three dimension (3D), animation (flip), morph, zoom, and combinations of effects thereof and the like known to one of ordinary skill in the art); and (6) lenticular parameters 302 (control and uniformity parameters of the print material if hardcopy prints is the destination of multidimensional digital master image(s) 303).

Moreover, digital image parameters, such as final image parameters 402 collected from image acquisition application 301, output parameters 405, type of effect 403, and/or micro-optical material (MOM) parameters 302, are important factors for the quality of the finished image in order to manage sharpness, resolution, depth and how colors look to the human viewer. Output parameters are obtained from; (1) viewing screen 305 (initially set up for existing digital multidimensional image viewing), (2) micro optical material (MOM) viewing screen, (3) standard viewing screen with a digital multidimensional image overlay, (4) outputs from printer 304 (hardcopy prints utilizing a special printer printing on MOM), or (5) parameters from graphic arts printers. Control and uniformity of the print material is important as the parameters of the material must be consistent for the quality of hardcopy multidimensional digital master image(s) 303. These factors in their entirety must be used and controlled for optimum results from the system/method. The preferred hardcopy is printed using MOM manufactured by processes disclosed in U.S. Pat. Nos. 5,362,351 and 6,060,003.

As previously noted, multidimensional photon platform 307 is preferably configured to receive 2D digital image(s) or scene(s) S via image acquisition application 301 and process the 2D digital image(s) or scene(s) S based on final image parameters 402 and output format desired, such as viewing screen 305 and/or printer 304, to produce high quality digital multi-dimensional optical image(s), such as multidimensional digital master image(s) 303. Multidimensional digital master image(s) 303 may be transmitted to viewing screen 305 and displayed or viewed thereon and/or transmitted to printer 304 for the production of hardcopy prints. Moreover, multidimensional digital master image(s) 303 may be transmitted to computer system 10, user system 220 and/or server system 260 (shown in FIGS. 1 and 2) via network 250.

As illustratively shown in FIG. 4 optimizing algorithm, software or applications 206 are utilized in multidimensional photon platform 307 to reconfigure, edit, and/or reconstruct images or scene S into multidimensional digital master image(s) 303. Preferably, optimizing algorithm, software or applications 206 may include image manipulation application program 307.1. Preferably, image manipulation application program 307.1 of image acquisition application 301 may convert or label scene(s) S into left digital image 1101 and right digital image 1102 (as shown in FIG. 11) or retrieve left digital image 1101 and right digital image 1102 of 2D image 1000 from image acquisition application 301.

As illustratively shown in FIG. 4 and as described more fully hereafter by reference to FIGS. 5, 7A and 7B, optimizing algorithm, software or applications 206 utilized in multidimensional photon platform 307 preferably include image manipulation 307.1 for calculating a parallax-based depth of field, a more defined method that uses lens geometry (of the lens utilized to capture a digital scene S) and digital image parameters set forth herein to eliminate many of the above errors of the prior art. In that regard, image manipulation 307.1 calculates minimum parallax (Pmin) 702, maximum parallax (Pmax) 706, and the frame number 704.

Still furthermore, image manipulation 307.1 may select closest point CP in scene S—the prominent foreground feature(s) of scene S. It is contemplated herein that closest point CP may be an object, person, place, thing, animal, text, graphic or other branding and the like, and combinations thereof. Moreover, closest point CP may include one or one or more closest point CP in scene S.

Figure 10:
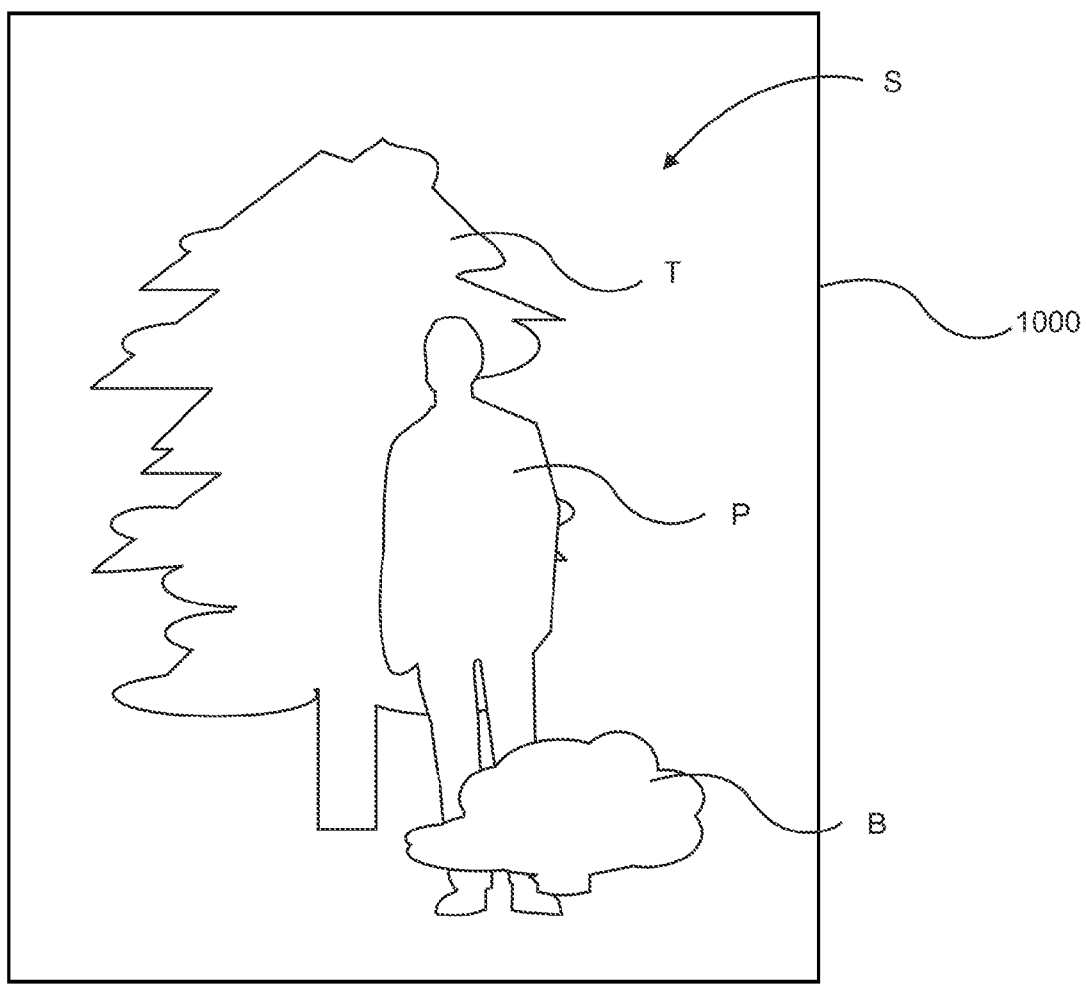
FIG. 10 is a diagram of an exemplary embodiment of a 2D digital image of the scene captured by the capture device.
Figure 12:
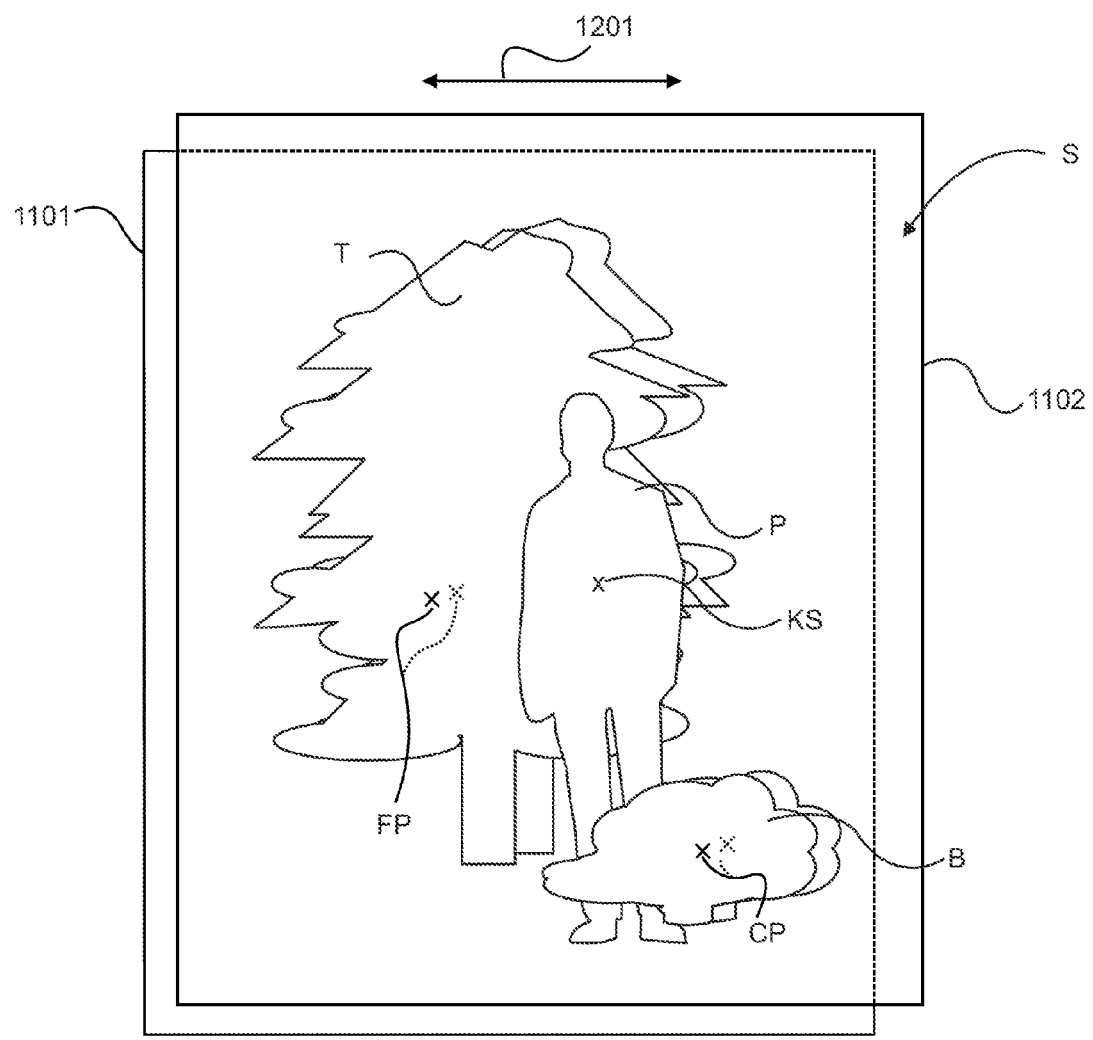
FIG. 12 is a diagram of an exemplary embodiment of frames, left view and right view, of the 2D digital image with aligned key subject.

Selection is preferably accomplished by identifying or clicking the closest point object in scene S displayed via computer system 10, user system 220 and/or server system 260. Also, image manipulation 307.1 may select furthest point FP in scene S—the prominent background feature of scene S. It is contemplated herein that furthest point FP may be an object, person, place, thing, animal, text, graphic or other branding and the like, and combinations thereof. Moreover, furthest point FP may include a furthest point in scene S. Selection is preferably accomplished by identifying or clicking the furthest point object in scene S displayed via computer system 10, user system 220 and/or server system 260. (As shown in FIG. 10).

Applications 206 may also include multi-dimensional design and manipulation 307.2, such as three dimension (3D), animation (flip), morph, zoom, and combinations of effects thereof and the like known to one of ordinary skill in the art, interphasing 307.3 (described hereinafter in connection with FIG. 6.1), final imagery geometry 307.4 (which preferably enables control, for example, of dimension and size of multidimensional digital master image(s) 303), and other application programs to reconfigure, edit, and/or reconstruct images or scene S into multidimensional digital master image(s) 303. Moreover, application programs 307 preferably enables control of, for example, the following variables: layer/frame count, visual design, depth of field, front parallax, and back parallax to reconfigure, edit, and/or reconstruct images or scene S into multidimensional digital master image(s) 303.

Referring again to FIG. 4, and to FIGS. 6.1 and 6.2, multi-dimensional design and manipulation 307.2 may include digital effects, such as three dimension (3D), animation (flip), morph, zoom, and combinations of effects thereof and the like known to one of ordinary skill in the art. Preferably, the three dimension (3D) effect involves layering multiple elements of an image into foreground, middle and background planes or image layers, as shown in frames 600 of FIG. 6.2, to provide perception of depth as seen in a micro-optical material (MOM) image or multidimensional digital master image(s) 303. These elements or layers 600 are then shifted relative to one another to produce the appropriate or desired parallax for multidimensional digital master image(s) 303 via multi-dimensional design and manipulation application program slider mechanism 1201 schematically shown in FIGS. 6.2 and 12. Preferably, animation (flip) utilizes frames, such as frames 601-603 of FIG. 6.1, in the sequence of the action arranged in order of occurrence. This sequence can be short, with only two frames, for example, or longer sequences of motion and changes determined by the number of frames used, frame number 704. Preferably, morph effect involves the gradual changing or transformation of one image into another image using computer animation techniques. This is best achieved with similar shapes or objects and additional software may be required to successfully create morphing effects. Preferably, zoom effect is a variation of the animation process involving gradually increasing the size of a single image to achieve a zoom effect. This gives the impression of the image moving closer to the viewer.

Multidimensional photon platform 307 further includes one or more applications 206 for controlling slider mechanism 1201 shown in FIGS. 6.2 and 12 so as to control the parallax of layers 600 relative to each other while maintaining a point, key subject point 609, in focus in scene S. Slider mechanism 1201 preferably enables an operator of multidimensional photon platform 307 to adjust one layer 600 relative to another layer 600 and adjust layers 600 relative to key subject point 609. Still further, foreground and background settings for maximum limits drive off of or relate to key subject point 609. Thus, adjustment of layers 600, for example, layer 602, layer 603, and/or layer 604 via slider mechanism 1201 for movement of key subject point 609 establishes key subject point 609 focused in the multidimensional digital master image(s) 303.

In the example of FIG. 6.2, each layer 600 includes the primary image elements of input file images or scene S from image acquisition application 301, such that key subject point 609 is offset from the principal axis 612 by a calculated parallax value (parallax value(s)—whether a minimum parallax value, intermediate parallax value, maximum parallax value, or calculated range of the usable parallax values). Parallax line 607 represents the linear displacement of key subject points 609.1-609.5 from the principal axis. Preferably delta 611 between the parallax line 607 and the principal axis (perpendicular line) 612 in the closest point image layer or foreground frame 605 (or furthest point image layer or background frame 601) represents a linear amount of the parallax value Pmax 706 or the optimum parallax value 708, which values are described herein after in connection with FIGS. 7A and 7B.

It is recognized herein that key subject point 609.3 in key subject point image layer or frame 3 603 is preferably positioned proximate midpoint 610 of the depth map, i. e., midpoint 610 between frame 1 601 to frame 5 605 and, more specifically, that key subject point 609.3 may be adjusted up to or proximately plus or minus fifteen percent (+/−15% adjustment) proximate from midpoint 610 for optimum production of multidimensional digital master image(s) 303. Moreover, key subject point KS is preferably positioned proximate midpoint 610 of the depth map or midpoint 610 between closest point CP and furthest point FP and, more specifically, key subject point KS may be adjusted proximately plus or minus fifteen percent (+/−15% adjustment) proximate from midpoint 610 for optimum production of multidimensional digital master image(s) 303. Moreover, the parallax value in the key subject point (key subject point 609.3) image layer (frame 3 603), or midpoint 610 may be set to zero and is preferably set to zero.

It is further recognized herein that key subject point 609.3 in frame 3 603 may be assigned by processor to a gray scale value of a mid-number or intermediate gray scale value or number within a gray scale range (0-255 for an 8-bit processor), for example a mid-number between 0-255, such as 127 in an 8 bit system.

It is further recognized herein that the gray scale digital image layers, layers 600, are preferably configured such that (1) key subject points 609 therein are aligned, (2) the parallax value in the key subject point image layer, midpoint 610, is zero, and (3) the parallax value in each of the other digital image layers 600 is within the calculated parallax value range.

It is known by one of ordinary skill in the art that different optimizing algorithm, software or applications 206, such as multidimensional photon platform 307, may be utilized to create multidimensional digital master image(s) 303 or techniques and parameters as disclosed in, for example, Microsoft Research entitled *A Review of Image-based Rendering Techniques, Orasee Corporation Software User Guide and Training and Support entitled Professional* 3D *and Motion Imaging Design.*

Referring now to FIG. 5, by way of example, and not limitation, there is illustrated a block diagram of an exemplary embodiment of multidimensional photon platform 307 which further includes one or more applications 206, such as image acquisition application(s) 301. Image acquisition application(s) 301 is preferably configured to receive image(s) or videos or scene(s) S from a smart phone, PDA, tablet, camera, or personal computer, such as digital capture device DCD and format or configure scene(s) S for input into multidimensional photon platform 307. For example, and not by limitation, one or more image acquisition application(s) 301 may include image acquisition applications for camera images, electronic device or phone covers, 3D map systems (for example, Google, Microsoft), point of purchase posters, medical images, 3D packaging, hardcopy from virtual reality, CAD systems, 3D consumer greeting cards, labels, tags, identification (ID) cards and the like, computer software, Photoshop, cinema4D, and the like, 3D video and combinations thereof. It is contemplated herein that image acquisition application 301 may prepare, format, convert, or configure 2D image(s) or scene(s) S or videos for interface with multidimensional photon platform 307. It is recognized herein that source digital image(s) or videos, such as scene(s) S, may be captured and input via image acquisition application 301 in multidimensional photon platform 307 from a variety of digital capture devices DCD, such as digital cameras (dual lens and single lens capturing multiple shots), video capture devices, two dimension (2D) to three dimension (3D) conversion systems, medical imagery (cathode ray tube (CRT), ultrasound, magnetic resonance imaging (MRI), computer tomography (CT)), computer generated images (computer aided design (CAD), 3D studio images, virtual reality, cinema fourth dimension (4D), satellite imagery (optical imagery, multi-spectral imagery (ultrasound, radar, infrared)) and the like.

It is recognized herein that image acquisition application 301 may be utilized to convert or reformat scene(s) S into a standard image format, such as JPEG, GIF, and TIF files, and, moreover, may be utilized to convert or reformat scene(s) S into stereo pairs of images, such as left digital image and right digital image of scene S (as shown in FIG. 11) or retrieving left digital image and right digital image scene(s) S.

Preferably multidimensional photon platform 307 further includes one or more applications 206, such as image manipulation 307.1, multi-dimensional design and manipulation 307.2, interphasing 307.3, and final image geometry 307.4, which may be programs, scripts, applications, firmware or the like. (See FIG. 5) Referring now to FIG. 6.1, by way of example, and not limitation, there is illustrated a diagram of an exemplary embodiment of two or more images, views, frames, or layers 600 created by multidimensional photon platform 307 of image(s) or scene(s) S or videos received from image acquisition application(s) 301. Preferably, image manipulation 307.1 reconfigures image(s) or scene(s) S or videos received from image acquisition application 301, generates one or more images, views, frames, or layers 600 of scene S, such as frame 601, frame 602, and frame 603, etc., from image(s) or scene(s) S or videos via image acquisition application 301. For example, image manipulation 307.1 may enable a user to create a left and right stereo pair of images, such as frame 601 and frame 602, selecting, identifying or clicking the point(s) of the key subject(s) KS in scene S, closest point CP in scene S—the prominent foreground feature of scene S, and furthest point FP in scene S—the prominent background feature of scene S, as further disclosed in FIG. 10. Moreover, image manipulation 307.1 preferably enables a user to create an applicable depth map therefrom layers 600.

It is known by one of ordinary skill in the art that different algorithms, such as pixel displacement algorithm, can be used to create or configure depth maps of layers 600 or techniques and parameters as disclosed in for example, IEEE Computer Society *Anisotropic Diffusion of Surface Normals for Feature Preserving Surface Reconstruction*, International Conference on 3D Digital Imaging and Modeling, 10/2003, pg. 353, incorporated herein by reference.

Referring again to FIG. 5, multi-dimensional design and manipulation 307.2 preferably enables a user to create or configure an applicable depth map of layers 600, such as stereo pairs of a single image, by painting a depth map using digital paint brush and gray color pallet of for example 0-255 shades of gray. A depth map preferably is a realistic multi-dimensional digital master image(s) 303 derived from layers 600 based on assigning a volumetric gray scale of a minimum or low or gray scale start number, such as 0 for white (being the nearest subject in a scene or layers 600), and assigning a high or maximum or gray scale end number, such as 255 (8 bit) for black (being the furthest subject in a scene or layers 600), and 253 or its equivalent range of shades of gray in between (gray scale intermediate numbers therebetween) the nearest and the furthest subject in a scene or layers 600. The closest or nearest point in the scene is the lightest (white) and the furthest is the darkest (black) with different levels of gray in between (gray scale).

Referring again to FIG. 5, interphasing 307.3 preferably breaks down the images of the stereo pairs or scene and recreates the image with segments tuned to the finished output (viewed on viewing screen 305 and/or printed on printer 304). Referring now to FIG. 6.1, by way of example, and not limitation, there is illustrated a diagram of an exemplary embodiment of the multidimensional photon platform 307 for interphasing 307.3. In the embodiment, interphasing 307.3 includes two or more images, views or layers 600 (totaling frame number 704, being the value of 3 in this figure) of scene S, in this case, frame 601-frame 3 603. Interphasing 307.3 preferably is a process to create a master image, such as multidimensional master image 303, and involves combining several different sections or segments of layer 600 of a 2D scene S to form a 3D or motion multidimensional master image 303. Interphasing 307.3 process preferably takes sections, strips, rows, or columns of pixels, such as columns 606 of the same section of each layer 600 of scene S, such as frame 601, frame 602, and frame 603, and reconfigures or lays them out in series side-by-side, such as in repeating series 608, and repeats this configuration for all layers 600 to generate multidimensional master image 303. Preferably, the number of columns 606 is determined by the micro-optical material (MOM) frequency of lens per inch—lens utilized to view a digital scene divided by the desired print resolution in dots per inch—of printer 304 or pixels per inch—of viewing screen 305. For example, if the lens is a 100 LPI lens and printer 304 is 300 DPI, then 300 DPI print/100 LPI lens=3 columns 606 in repeating series 608 to form multidimensional master image 303. In the case of barrier screens (viewing screen 305), the barrier screen count would replace the lens per inch LPI and the output device pixel density would replace the DPI. Thus for a barrier screen with 91 lines per inch and an output device with a pixel density of 182, the calculation would derive a number of 2 columns 606 in repeating series 608 to form multidimensional master image 303. It is known by one of ordinary skill in the art that different algorithms, such as interlacing algorithm, can be used to create or generate multidimensional master image 303. Multidimensional master image 303 may be viewed under the appropriate or selected lens, whether lenticular 302, receive printer 304, and/or viewing screen 305, to "playback" the recorded lenticular effect (3d images or motion images). The purpose of the interphasing is to sequence the information from all frames so the human eye will see the appropriate information to perceive the desired effect. A minimum of two images is required for three dimension (one left, one right) and proper sequencing for flip (both eyes see image one and on turning the image both eyes see image two) or sequencing of frames for motion, zoom or morphing. The human visual system combines the information from both eyes in the brain to perceive the desired effect.

The foregoing interphasing 307.3 process is non-selective and takes each and every pixel of a scene through this striping process and may be destructive to the image resulting in pixel distortion to areas of multidimensional master image 303 that do not change from pixel to pixel from frame 601, frame 602, and frame 603. Thus the multidimensional photon platform 307 preferably further includes one or more applications 206, such as custom interlacing algorithm of interphasing 307.3 enabling pixel selective interphasing of the pixels of each frame (selective interphasing), such as selectively interphasing sections of frame 601-frame 603 to determine which if any, pixels or section(s) of frames, frame 601-frame 603, require interphase processing via interphasing 307.3. For example, by selective interphasing only those pixels that change from frame to frame, such as frame 1 601, frame 2 602, and frame 3 603, custom interphasing algorithm of interphasing 307.3 preferably is configured to reduce pixel distortion in section(s) of frame 601-frame 603 that do not change from frame to frame or that a user does not want changing from frame to frame. Preferably, non-application of interphasing algorithm of interphasing 307.3 to areas or section(s) of frame 601-frame 603, such as key subject, zero parallax, non-moving sections of animations, non-moving text, logos, etc., and/or graphics, results in sections that are clear and crisp without section movement. This results in higher quality multidimensional digital master image(s) 303 and reduces processing time of computer system 10, user system 220 and/or server system 260 (shown in FIGS. 1 and 2) to generate multidimensional digital master image(s) 303.

Referring again to FIG. 5, final image geometry 307.4 preferably configures or tunes multidimensional master image 303 to correspond to the finished output device, such as viewing screen 305 or printer 304. Moreover, multidimensional master image 303 may be transmitted to computer system 10, user system 220 and/or server system 260 (shown in FIGS. 1 and 2) via network 250. Furthermore, final image geometry 307.4 may be utilized to configure multidimensional master image 303 in a format which is appropriate for viewing on a viewing screen 305 or RIPPED (Raster Image Processor) for printing multidimensional master image 303 on a commercial printing machine such as flexography, lithography, or direct print, printer 304.

Referring now to FIGS. 7A & 7B, by way of example, and not limitation, there are illustrated spread sheets for calculating digital image parameters, such as minimum parallax (Pmin) 702, maximum parallax (Pmax) 706, and frame number 704 based on the digital input imagery resolution and the lens Ls geometry, respectively. In the case of viewing screen 305, if the screen is a lenticular screen then no changes are encountered; however, for non-lenticular screens, the Ls is replaced with the device type DT, respectively.

The maximum number of frames for use in a micro-optical material project is calculated by the following formula:

$$R/L = F\text{max}; \tag{1.1}$$

Where R is the output resolution (Output DPI Max) of printer 304 and L is LPI (proposed lens per inch of the viewing lenticular screen) resulting in Fmax or the maximum number of layers 600 or maximum views in multidimensional digital master image(s) 303 (as shown in FIG. 6.2) or maximum number of gray scale digital image layers 600 to be used in generating multidimensional master image 303. This formula is applied to motion micro-optical material imagery as well as 3D or stereoscopic imagery generated by multidimensional photon platform 307 from image acquisition application 301. In the example of FIG. 7A, the maximum number of frames, Fmax, is 24 based on an R value of 2400 DPI and an L value of 100 LPI. The linear relationship for the number of layers 600 preferably is based on the depth resolution of the printed information on the back side of micro-optical material (MOM) 302. If one examines the limit calculated by Takanori Okoshi, (*Three-Dimensional Imaging Techniques*, Academic Press, 1976), incorporated herein by reference, the limit is a function of the sampling effect of the human visual system and a finite limit to the resolution of the lens system. The functional relationship is logarithmic, however, within the range of lens per inch of LPI (40 to 300) the linear assumption holds. The functional relationship is preferably working or calculated in a small region of one cycle of the logarithmic chart and shows less than a ½ cycle change. Within this narrow limit, linearity appears valid. The second assumption required for this relationship is that the material, micro-optical material (MOM) 302, is uniform in pitch and thickness. The material for flexography and digital printing must have uniform pitch and perfect alignment of the lens pattern. The tolerance for change in pitch is one quarter of the total width of one lens, or 2.5 mils for a 100 lens per inch pattern. This tolerance must be retained from roll to roll and lot to lot. If pitch and or thickness varies, out of focus or jumping images will be produced. A preferred material is that produced in accordance with U.S. Pat. No. 6,060,003, entitled Method and Apparatus for Making Lenticular plastic.

Similarly experiments have shown that the turbidity of the output print influences the F value in Equation 1.1. Experimental results show when working with flexographic printing the number of frames F must be divided by 2 as the interference influences the resolving power of the lens array.

The number of frames or gray scale image layer number, such as frame number 704, for use in a barrier viewing screen project, such as viewing screen 305, is calculated by the following formula:

$$PD/B = F\text{opt}; \tag{1.2}$$

Where PD is the pixel density resolution of viewing screen 305 and B is BPI (proposed barrier lens per inch of the viewing screen), resulting in Fopt or the optimum number of layers 600 or gray scale image layer number or views in multidimensional digital master image(s) 303 (as shown in FIG. 6.2). This formula is applied to 3D or stereoscopic imagery generated by multidimensional photon platform 307 from image acquisition application 301. In the example of FIG. 7B, frame number 704 is 2 based on a PD value of 188 and a B value of 94 BPI. It is recognized herein that two frames is typical for stereo pair images in the .jpg and .mpo file formats but does not represent a limitation on the number of images. For example another embodiment could encompass a dynamic real-time angle adjusting barrier screen that could display a plurality of images beyond simple two frames stereo.

The minimum usable parallax value (Pmin) 702 of a range of usable parallax values for micro-optical material applications is preferably calculated by the following formula:

$$F/D = P\text{min}; \tag{2.1}$$

Where F is the number of frames used during interlacing (interphasing 307.3 as described in FIG. 5) and D is the DPI (dots per inch) resolution of the digital input file images or scene S from image acquisition application 301, resulting in Pmin or the minimum parallax between adjacent layers 600 (as shown in FIG. 6.2). This formula eliminates fractional pixel movements that cause digital distortion during parallax generation. It is contemplated herein that Pmin is preferably based on the smallest possible pixel movement of one pixel. In the example of FIG. 7A, Pmin 702 is 0.040 inches, based on a frame number 704 of 12 and a digital input file resolution D of 300 DPI.

The minimum usable parallax value (Pmin) 702 for a non-lenticular screen is preferably calculated by the following formula:

$$F/R = P\text{min}; \tag{2.2}$$

Where F is the number of frames used during interlacing (3D interphaser 506 as described in FIG. 5) and R (resolution) is the resolution of the digital input file images or scene S from image acquisition application 301, resulting in Pmin or the minimum parallax between adjacent layers 600 (as shown in FIG. 6.2). This formula eliminates fractional pixel movements that cause digital distortion during parallax generation. It is contemplated herein that Pmin is preferably based on the smallest possible pixel movement of one pixel. In the example of FIG. 7B, Pmin 702 is 0.007 inches, based on a frame number 704 of 2 and a pixel density file resolution R of 300.

It is recognized herein that optimizing frame number 704 or views enables multidimensional photon platform 307 to take full advantage of the capabilities of printer 304/viewing screen 305. Using the maximum output resolution for printer 304/viewing screen 305 is not optimum as only one pixel of information will be available for each frame or strip of micro-optical material/barrier screen data, such as strips or columns 606, shown in FIG. 6.1. Furthermore, multidimensional photon platform 307 is preferably configured to enable micro-optical material/barrier screen calibration (pitch adjustments, resolution changes, resizing) and requires calculating pixel per frame values of 2 or higher.

The optimum number of frames is determined by the following formula for micro-optical material applications:

$$(R/M)/L = F\text{opt}; \tag{3.1}$$

Where R is the output resolution (Output DPI Max) of the printing device, M is a variable from 2 to 4 representing the even multiple output resolutions of the printer obtained from the pixels per frame calculation, and L is LPI (proposed lens per inch), resulting in Fopt or the optimized number of layers 600 or views. In an Epson printer, for example, the variable M may be 2, giving even output resolutions of 360, 720, 1440, and 2880 DPI. Another example is a Canon printer, where a variable 2 (multiplier M) gives even multiple output resolutions of 300, 600, 1200, and 2400 DPI.

The M variable is calculated by determining pixel per frame DPI values. Preferably, the actual output resolution during printing is set to maximum even though calculated using a lower resolution even multiple M. Utilizing higher pixel per frame values reduces micro-optical material calibration distortion. It is further recognized herein that two pixels per frame is preferably the minimum to achieve high level visuals. It is still further recognized herein that no fractional pixel movements helps reduce or eliminate digital distortion in multidimensional digital master image(s) 303. In the example of FIG. 7A, the maximum printer output resolution R is 2400, and the proposed screen lens per inch is 100 LPI. Assuming a value of 2 for the multiplier M, gives the optimum number Fopt as 12.

The maximum number of frames is determined by the following formula for non-lenticular viewing screens:

$$PD/B = F; \quad (3.2)$$

Where PD is the output resolution pixel density of the viewing screen 305 and B is the proposed barrier pitch, resulting in F or the optimized number of layers 600 or views. It is recognized herein that no fractional pixel movements helps reduce or eliminate digital distortion in multidimensional digital master image(s) 303. In the example of FIG. 7B, the maximum viewing screen output resolution PD is 188 and the proposed barrier screen pitch is 94 BP, giving the optimum number Fopt as 2.

The theoretical maximum usable parallax value (Pmax) 706 of a range of usable parallax values in either the closest point layer 605 or the furthest point layer 601 is preferably calculated by the following formula for micro-optical material applications:

$$W \times F = P\text{max}; \text{ (MOM Application)} \quad (4.1)$$

Where W is the width of a single lens Ls (micro-optical material width, lens per inch) in inches and F is the number of frames used, resulting in the value of Pmax 706 that optimizes the optical characteristics of the lenticular lens Ls. It is recognized herein that higher values than this theoretical maximum can be used but may exceed the resolving power of the lens Ls. It is contemplated herein that Pmax 706 is preferably based on the lenticular width for optimum control of parallax in multidimensional digital master image(s) 303. In the example of FIG. 7A, Pmax is 0.12 for a W of 0.0101 inches (L=100) and an F of 12.

The theoretical maximum usable parallax value (Pmax) 706 in either the closest point layer 605 or the furthest point layer 601 is preferably calculated by the following formula for non-lenticular viewing screens:

$$WB \times F = P\text{max}; \text{ (Non MOM Application)} \quad (4.2)$$

Where WB is the barrier pitch width of a display type DT (Barrier Screen) in inches and F is the number of frames used, resulting in the value of Pmax that optimizes the optical characteristics of the barrier screen display type DT. It is recognized herein that higher values than this theoretical maximum can be used but may exceed the resolving power of the display type DT. It is contemplated herein that Pmax 706 is preferably based on barrier pitch width for optimum control of parallax in multidimensional digital master image(s) 303. In the example of FIG. 7B, Pmax is 0.02 for a WB of 0.0106 inches and an F of 2.

It is recognized that the maximum values of Pmax given by Equations 4.1 and 4.2 are calculated theoretical values and may be adjusted or changed in practice depending on the design of the final multi-dimensional piece or the needs of the client. It is contemplated that the calculated theoretical maximum values will be used in the vast majority of finished imagery and will be the initial starting point in the final design. In those instances where sharper imagery in a particular area of the image is needed, a smaller parallax value Pint is used, while in those images that can tolerate more parallax, a larger parallax value Pmax+ is used. (Pint and Pmax+ are described hereinafter.) The operator can view the image in an anaglyph mode, on a viewing screen or in hardcopy, and make the desired adjustments to the maximum parallax value used.

The intermediate parallax values Pint 710 between Pmin and Pmax are calculated by the following formula:

$$P\text{min} \times K = P\text{int}; \quad (5)$$

(Where K is an integer representing a whole pixel move, and the same equation holds for viewing screen and micro-optical material (MOM) applications in FIGS. 7A and 7B)

FIG. 7A
0.04*1=0.04; Pmin
0.04*2=0.08 Pint
0.04*3=0.12; Pmax

FIG. 7B
0.007*1=0.007; Pmin
0.007*2=0.0013; Pint
0.007*3=0.020; Pmax

Where Pint 710, the intermediate parallax values 710 between Pmin and Pmax, does not exceed the Pmax 706 and K is a variable number based on the number of even multiples between Pmin 702 and Pmax 706. (Intermediate parallax values 710 are even multiples of the parallax minimum, Pmin 702. Pmin 702 is multiplied by 1, 2, 3, 4 etc. until the Pmax 706 value is reached). It is contemplated herein that intermediate parallax values 710 are preferably based on even integer multiples of Pmin 702 for optimum control of parallax of multidimensional digital master image(s) 303. The frames intermediate to KS plane and foreground or background planes should be displaced by an integer pixel amount such that the parallax value in each intermediate frame is equal to or between Pmin or Pmax to insure the visual continuity of the total image (smoothness).

Values beyond Pmax 706 are calculated using the same method as Pint 710, i.e., Pmax*2, Pmax*3, etc. These values represent parallax points favoring the center of each lens peak and can be utilized as super parallax Pmax+ 711.

Some art can be calibrated for Pmax+, preferably background or far parallax, by sizing the art elements to size match the parallax value and repeating the art element with the same spacing, i.e., Pmax+ value such as 0.40. Therefore, the art element pattern spacing would be 0.40 inches.

The full range of usable parallax for the foreground and background elements/layers in relation to key subject point 609 or key subject element/layer for a given 3D project is calculated by simply mirroring the positive values obtained from FIGS. 7A & 7B and assigning negatives to the rear values and zero to the key subject.

| FIG. 7A | | |
|---|---|---|
| −0.24; | Pmax+ | Background Parallax Negative |
| −0.12 | Pmax | |
| −0.08 | Pint | |
| −0.04 | Pmin | |
| 0.0 | Key Subject | Foreground Parallax Positive |
| 0.04 | Pmin | |
| 0.08 | Pint | |
| 0.12 | Pmax | |
| 0.12; | Pmax+ | |

A typical technique is to use half the highest rear parallax value for the highest front parallax value as shown above.

In addition, it is recognized herein that calculating Pmin 702 and/or Pmax 706 in relation to the output device, such as printer DPI and micro optical material (lenticular) lens per inch for printer 304 or viewing screen 305 with equivalent parameters, such as screen barrier, lenticule width, screen pitch and pixel density, and integration of this information into the image creation process of multidimensional photon platform 307 improves production of high quality multidimensional digital master image(s) 303. These basic parallax calculation formulas establish the minimum parallax Pmin 702 and maximum parallax Pmax 706 values that may be used on any stereoscopic imaging project that will employ digital image input and resolution dependent print output. It is recognized herein that these parameters also establish pixel per frame values and create a general guide for selecting printer 304, micro-optical material lens or viewing screen 305, barrier screen and digital file combinations that have a common compatibility and purpose. In tests using these base values, every stereoscopic test image utilizing multidimensional photon platform 307 has had excellent 3D effect and virtually none of the distortion or fuzziness associated with previous methods. It is still further recognized herein that utilizing multidimensional photon platform 307 optimizes input/output capabilities with a certain lens Ls material or display type DT.

The optimized calculation of parallax for 3D stereoscopic images by use of multidimensional photon platform 307 eliminates design defects including ghosting and double images. It also eliminates the blurry background and foreground objects seen with applying excessive parallax values.

Parallax adjustment Pa is determined by the following formula for micro-optical material applications:

$$Pa = Rs/F \qquad (6)$$

Where Rs for printed images is resize adjustment and F is the number of frames used. Rs is determined from a calibration of the output device to the micro-optical material. A pitch test is output on the final print device and used to determine the adjustment required to the art work to match the material. The pitch test is a series of calculated black lines at different known values. An example is a pitch test for 100 lenses per inch where the calculated values are between 99.95 and 100.05 at intervals of 0.01. The output is matched to the micro-optical material and a value is determined as to how much the actual work piece needs to be expanded or contracted to match the micro-optical array. Rs is determined by:

$$Rs = (\text{Original Art Width}) - \text{Resize Width} \qquad (7)$$

Resize Width RW is calculated in a resize calculation using the value determined in the pitch test. This value represents the amount the original art work is shrunk or expanded so the interphased pixel columns lie directly behind the lens of the micro-optical material. In the example of FIG. 7A, the original art work width AW is 4.599, the resize width RW is 4.46, Rs is 0.139 and F is 12, giving a value of Pa of 0.012. The parallax adjustment of +/−0.012 resetting maximum parallax Pmax 706 (from 0.12 to 0.132), compensates for pitch resize distortion for multidimensional digital master image(s) 303.

No resize adjustment is necessary for barrier screen applications as the original art work is sized to the viewing device. Hence, Equation 6 does not apply.

The optimum parallax is determined by the type of device (line screen count and distance from image to screen), viewing distance, pixel density, and image size. Presently look up tables are used to determine optimum parallax. The tables are based on device and image size and experimental results wherein FIGS. 7A & 7B represent examples of such tables. The variables on FIG. 7A (R, L, F, D and Ls) would be changed appropriately for the mix of devices and viewing method to determine the frame count and parallax required for optimum 3D visual effects.

Utilizing multidimensional photon platform 307 for integrating the calculated minimum parallax (Pmin) 702, maximum parallax (Pmax) 706, key subject point 609, and frame number 704 based on the digital input imagery resolution and the lens Ls geometry, respectively, results in focused key subject point 609 in multidimensional digital master image(s) 303 with virtually no distortion or fuzziness. Furthermore, pitch Pt, resize Rs, and frame number F may be utilized to calculate parallax adjustment Pa where needed for printed results. Barrier screen calculations depend upon look up tables embedded in the platform wherein FIGS. 7A & 7B represent examples of such tables.

While key subject point 609 may be at the approximate midpoint and the parallax as depicted in FIG. 6.2 shows a linear application of the parallax, the key subject point 609 may be off center, as shown in frames 600 of FIG. 6.3. Also, the parallax may be applied in a nonlinear manner. Linear application of parallax is illustrated in FIGS. 6.2 and 6.3 and is defined as when frames 602 and 604 are located such the displacements of the key subject points 609.2/609.7 and 609.4/609.9 lie on the straight line 607/607.1 drawn from the key subject point in 601 and 605 and passing through the key subject point 609.3/609.8 in 603. Nonlinear is defined as when the displacements of the key subject points 609.2/609.7 and 609.4/609.9 do not lie on the straight line 607/607.1 (not shown). In either case, the displacement values of 609.2/609.4 and 609.7/609.9 must have a value corresponding to a Pmin or Pint value. This displacement value allows for whole integer pixel displacement. The value of the closest displacement, DF, does not have to equal to the displacement value of the furthest point, DB, i.e., front and back parallax, do not have to be equal. The value of each of these two displacements must be within Pmin and Pmax or Pmax+. The total parallax is the addition of the absolute values of the front and rear parallax.

In the example of FIG. 6.3, each layer 600 includes the primary image elements of input file images or scene S from image acquisition application 301, such that key subject point 609.6 through 609.10 may be off center to the midpoint of frame 603. The parallax of the other frames maybe applied in a linear (depicted) or nonlinear manner as previously described.

Figure 8:
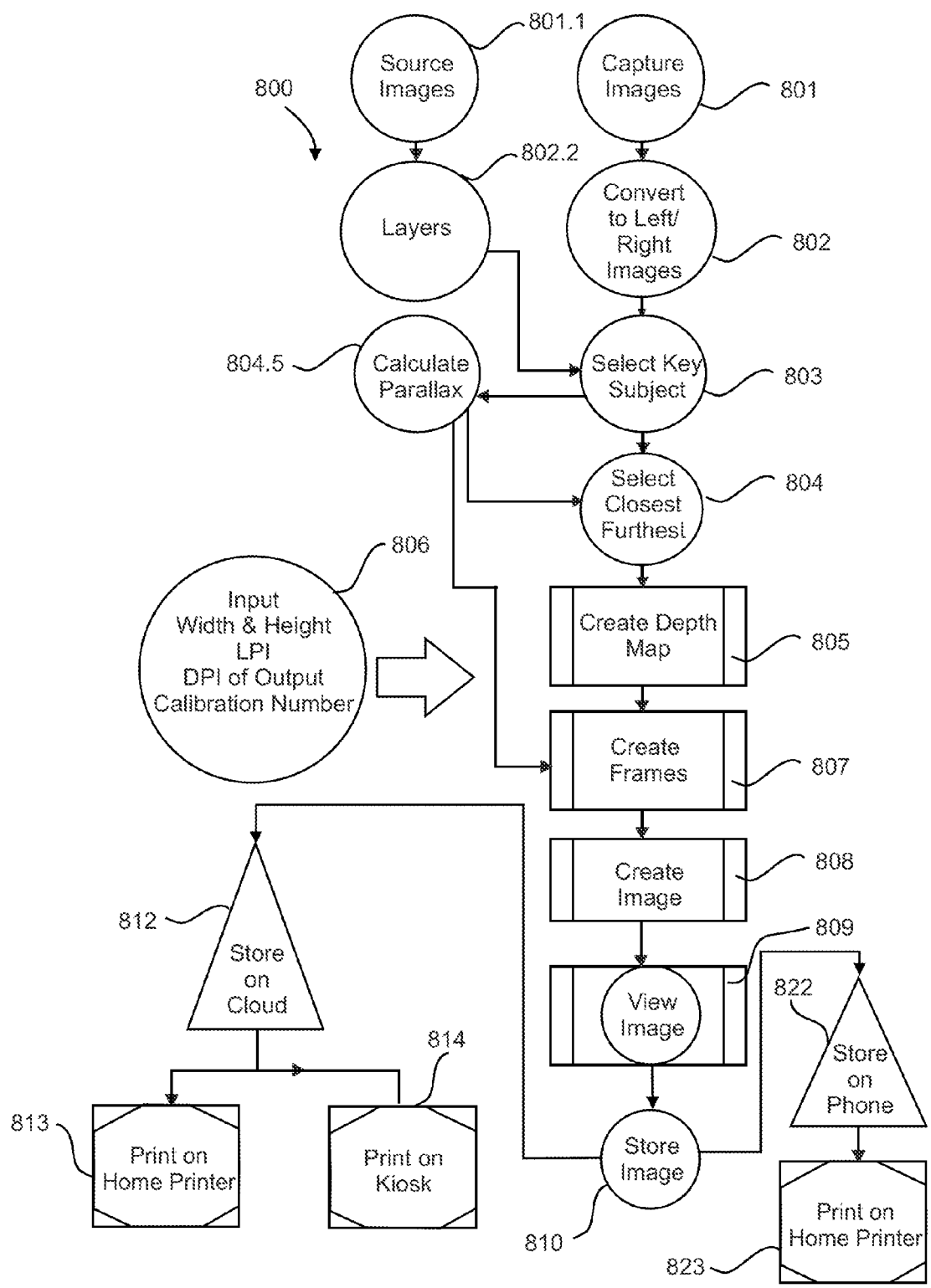
FIG. 8 is a flow diagram of a method of generating a multidimensional image from the 2D digital images (input as a single 2D image or a stereo pair)
Figure 9:
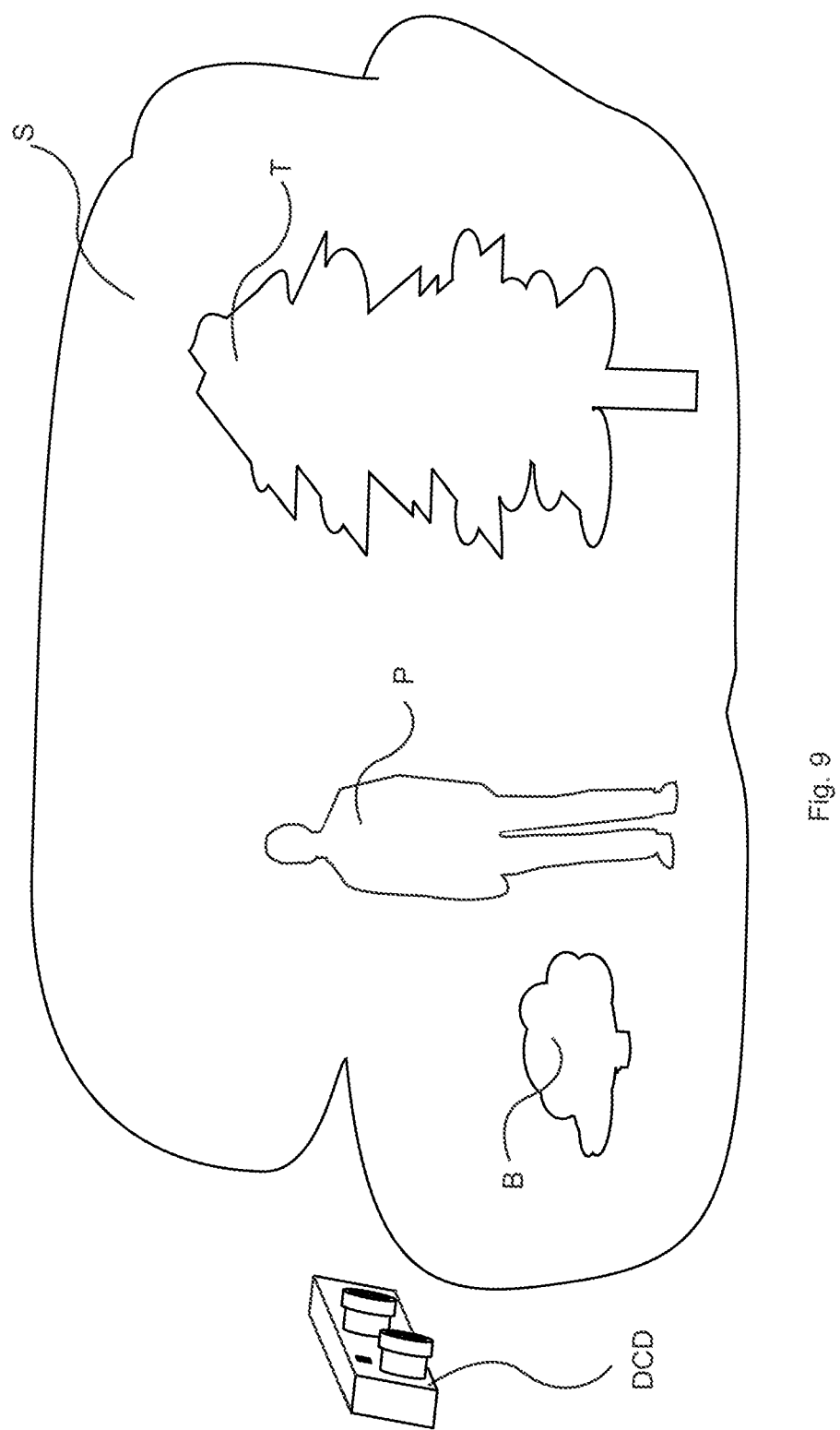
FIG. 9 is a diagram of an exemplary embodiment of a scene and digital capture device.

Referring now to FIGS. 8-12, there is illustrated by way of example, and not limitation, a flow diagram 800 of a method of capturing a 2D image or scene S, generating frames, reconfiguring, processing, displaying, storing and printing multidimensional digital master image(s) 303. In block or step 801, images of scene S or stereo pair are captured or input via computer system 10 and/or user system 220 and inputted via image acquisition application 301 into computer system 10, user system 220, server system 260 (shown in FIGS. 1 and 2), and/or multidimensional photon platform 307 (shown in FIG. 5). FIG. 9 illustrates by way of example, and not limitation, a diagram of digital capture device DCD capturing scene S, including objects at different depths, such as bush B in the foreground, tree T in the background, and person P between bush B and tree T. Digital capture device DCD may include one or more digital capture devices DCD to capture different perspectives or angles of the same scene S. It is contemplated herein that scene S may also be computer generated.

Alternatively, in block or step 801.1, images of scene S may be sourced from graphic design application/software 206, such as Photoshop, Cinema 4D, 3D Studio Max, Computer Aided Design (CAD), Free Cinema, Video System, any of the image acquisition application 301 set forth in FIG. 5 or any other applicable image capture system.

In FIG. 10, there is illustrated by way of example, and not limitation, a representative example of one or more 2D source image(s) 1000 of scene S captured by digital capture device DCD. In block or step 802 of FIG. 8, 2D image 1000 of scene S is converted into left digital image 1101 and right digital image 1102 of scene S (as shown in FIG. 11). If digital capture device DCD captures multiple perspectives or angles of scene S, left digital image 1101 and right digital image 1102 of 2D image 1000 may be retrieved from digital capture device DCD.

Alternatively, in block or step 802.2, 2D image 1000 of scene S from step 801.1 is converted into layers of depth having foreground layer, such as closest point CP, key subject point KS, and a background, such as furthest point FP.

In block or step 803, the prominent features, key subject plane, or key subject point KS of scene S is selected (e.g. point on a person P).

It is contemplated herein that the key subject point KS may be positioned on an object, person, place, thing, animal, text, graphic or other branding and the like, and combinations thereof. Moreover, key subject KS may include one or more key subject objects within scene S, in which case a key subject frame is used rather than a key subject point. Selection is preferably accomplished by identifying or clicking the point(s) of the key subject(s) KS in scene S displayed via computer system 10, user system 220 and/or server system 260.

In block or step 804, a prominent foreground feature(s) and a prominent background feature(s) of scene S are selected as the closest point CP) and the furthest point FP, respectively. It is contemplated herein that closest point CP and furthest point FP may be an object, person, place, thing, animal, text, graphic or other branding and the like, and combinations thereof. Moreover, closest point CP and furthest point FP may include one or more closest points and furthest points within scene S. Selection is preferably accomplished by identifying or clicking the closest point (e.g., bush B) and furthest point (e.g., tree T) object in scene S displayed via computer system 10, user system 220 and/or server system 260. Moreover, within the image manipulation module 307.1 a module exists to define the closest and furthest point with minimum user or operator supervision.

In block or step 804.5, inputting and/or calculating minimum parallax Pmin 702, maximum parallax Pmax 706, frame number 704, F opt, Pint, and Pmax+, as set forth in FIG. 7A and 7B, or are inputted and/or calculated.

Referring again to FIG. 6.2, key subject point KS (609.3) is preferably positioned proximate midpoint 610 of the depth map or midpoint 610 between closest point CP (frame 601) and furthest point FP (frame 605). More specifically, key subject point KS may be adjusted up to or proximately plus or minus fifteen percent (+/−15% adjustment) proximate from midpoint 610 for optimum production of multidimensional digital master image(s) 303.

It is further recognized herein that key subject point KS may be assigned by the processor a gray scale value of a mid-number or intermediate gray scale value or number within a gray scale range (0-255 for an 8-bit processor), for example a mid-number between 0-255 for an 8-bit processor, such as 127, closest point CP may be assigned a gray scale value of a start number, for example a start number between 0-255 for an 8-bit processor, such as 0, and furthest point FP may be assigned a gray scale value of an end number, for example an end number between 0-255 for an 8-bit processor, such as 255, and numbers in between are intermediate numbers.

Another exemplary embodiment of multidimensional photon platform 307 comprises using an interpolated gray scale map to generate volumetric parallax using values assigned to the different points (closest point CP, key subject point KS, and furthest point FP) in scene S. Moreover, multidimensional photon platform 307 enables volumetric parallax within scene S.

It is still further recognized herein that multidimensional photon platform 307 interpolates intermediate points based on the assigned points (closest point, key subject point, and furthest point) and assigns values to those intermediate points and renders the sum to a gray scale depth map.

Referring again to FIG. 12, there is illustrated by way of example, and not limitation, a representative example of aligning key subject point KS in left digital image 1101 and right digital image 1102 via slider mechanism 1201 utilizing one or more applications 206 within multidimensional photon platform 307. Moreover, slider mechanism 1201 may be utilized to adjust key subject point KS up to or proximately plus or minus fifteen percent (+/−15% adjustment) from the midpoint 610 for optimum production of multi-dimensional digital master image(s) 303.

In block or step 805, a depth map of scene S is preferably created or generated from the left and right digital images of block or step 802 via one or more applications 206. For example, as set forth above in connection with FIG. 5, multi-dimensional design and manipulation 307.2 preferably creates an applicable depth map of left digital image 1101 and right digital image 1102 of 2D image 1000 of scene S, such as stereo pairs. The depth map preferably is based on 0 for white (being closest point CP in scene S) and 255 for black (being the furthest point FP in scene S) and 253 shades of gray in between closest point CP and furthest point FP in scene S. In the alternative, multi-dimensional design and manipulation 307.2 preferably may create an operator controlled depth map to be produced by painting an image in grayscale.

In block or step 806, digital image parameters including output device parameters for multidimensional digital master image(s) 303, such as width and height of multidimensional digital master image(s) 303, optical image parameters, 302 parameters, printer 304 parameters, and/or viewing screen 305 parameters, key subject and the depth of field parameters (closest point CP and furthest point FP, final image parameters 402, output parameters 405, type of effect 403, and like parameters are preferably input into flow diagram 800.

In block or step 807, layers 600 from scene S as illustrated in FIGS. 6.1 and 6.2 totaling frame number 704 are created or generated as set forth in connection with FIGS. 7A and 7B, based on frame number 704, and a minimum parallax (Pmin) 702 and a maximum parallax (Pmax) 706 are preferably determined.

In block or step 808, interphasing or selective interphasing of columns of pixels of layers 600, as shown in FIG. 6.1 or FIG. 5, respectively, is preferably performed to create or generate multidimensional digital master image(s) 303.

Multidimensional digital master image(s) 303 is preferably viewed in block or step 809 on viewing screen 305.

In block or step 810, multidimensional digital master image(s) 303 is preferably stored in computer system 10, user system 220 and/or server system 260 (shown in FIGS. 1 and 2). In blocks or steps 812/22, multidimensional digital master image(s) 303 are transmitted between computer system 10, user system 220 and/or server system 260 (shown in FIGS. 1 and 2). In block or step 813/14/23, multidimensional digital master image(s) 303 may be printed whether via home, commercial, ink jet or kiosk style printer 304, such as standard graphics press or flexography, whether printing single image, multiple images, and printing single prints or multiple prints of multidimensional digital master image(s) 303.

It is contemplated herein that computer system 10 may execute any of the steps in FIG. 8.

Referring now to FIGS. 13.1, 13.2, 13.3, 13.4, by way of example and not limitation, there are illustrated exemplary embodiments of steps or methods by which one, two or multiple images of the same scene S or multiple images extracted from different scenes S can be input into multidimensional photon platform 307, and from which multidimensional photon platform 307 will create a multidimensional image.

In block or step 1301 of FIG. 13.1, similar to step 801, a single two dimensional digital source image of scene S is captured or input via computer system 10 and/or user system 220 and inputted via image acquisition application 301 into computer system 10, user system 220, server system 260 (shown in FIGS. 1 and 2), and/or multidimensional photon platform 307 (shown in FIGS. 4 and 5). In block or step 1302 and 1303 of FIG. 13.2, similar to step 801, images of a stereo pair, left image 1302 and right image 1303, are captured or input via computer system 10 and/or user system 220 and inputted via image acquisition application 301 into computer system 10, user system 220, server system 260 (shown in FIGS. 1 and 2), and/or multidimensional photon platform 307 (shown in FIGS. 4 and 5). After capture and/or input as shown in FIGS. 13.1 and 13.2, the 2D source images 1301, 1302 and 1303 of scene S may be processed as described above in connection with the flow diagram of FIG. 8 to create the multidimensional digital master image 303.

In FIG. 13.3, different or plurality of two dimensional digital source images of a single scene S, such as views 1305.1, 1305.2, 1305.3, 1305.4, are captured, generated or input via computer system 10 and/or user system 220 and inputted via image acquisition application 301 into computer system 10, user system 220, server system 260 (shown in FIGS. 1 and 2), and/or multidimensional photon platform 307 (shown in FIGS. 4 and 5). Digital recording devices such as cameras, x-rays, ultra-sound etc. are used to obtain the 2D digital views 1305.1-1305.4 of scene S from different angles. These different views of the same scene S are then interrelated to the calculated parallax. Preferably, views 1305.1, 1305.2, 1305.3, 1305.4 of single scene S are tied to the knowledge of the recording devices and positions relative to key subject point KS of scene S. As key subject point KS is the zero point and the Pmax is known from the calculation of the spread of the views 1305.1, 1305.2, 1305.3, 1305.4 of single scene, a depth map is generated and utilized to create the appropriate 3 Dimensional image of scene S. Views 1305.1, 1305.2, 1305.3, 1305.4 of single scene S can also be computer generated with such software as 3D Studio Max, Cinema 4D, CAD or any similar programs where different views of the same scene S can be generated from predetermined positions related to the output of the viewing devices. Data input into multidimensional photon platform 307 relative to the given output device is used to calculate the given Pmax, as described above.

After capture and/or input as shown in FIG. 13.3, the plurality of two dimensional digital source images of views 1305.1-1305.4 may be further processed in accordance with the flow diagram of FIG. 8. The technique to capture views 1305.1, 1305.2, 1305.3, 1305.4 of a single scene, either from a recording device (Camera, Ultra-Sound, CAT, etc.) or from the computer program, is always set up so the focal point (key subject point KS) is the same point in each of views 1305.1, 1305.2, 1305.3, 1305.4 of the single scene. The input of views 1305.1, 1305.2, 1305.3, 1305.4 of single scene (frames 600) enables multidimensional photon platform 307 to then create the necessary information, such as calculated Pmax, Pmin, key subject point KS, to create the appropriate interphased multidimensional image with the format necessary for the specified output device to create multidimensional digital master image(s) 303. Digital master file 303 may be viewed or printed as previously described.

In FIGS. 13.4 and 14, two dimensional digital source images of a plurality or multiple scene S as images 1306.1-1306.5 of multiple different scenes S1-S5 are captured, generated or input via computer system 10 and/or user system 220 and inputted as 2D digital source image via image acquisition application 301/801. From each of the images 1306.1-1306.5, different objects or sections 1307.1-1307.5 of scenes S1-S5 are extracted through masking techniques in computer programs such as Photoshop or similar programs. The resulting frames or layers 1308.1-1308.5 are input into a slider program 1201 as depicted in FIG. 14. The slider program 1201 preferably is embedded into image manipulation 307.1. The frames or layers 1308.1-1308.5 are adjusted A by moving each layer within the slider space, such as between closest point CP (1405.1) and furthest point FP (1405.2). The resulting movement is monitored by the operator by viewing the images in an anaglyph on a monitor, thereby providing real time feedback. Once the proper position is obtained for each frame or layer, the resultant layers 1406 of frames or layers 1308.1-1308.5 are sent to step 803 in the flow diagram of FIG. 8.

It is contemplated herein that multidimensional photon platform 307 can be used to enhance an image by using an interpolated gray scale map to generate volumetric information of the gray scale for 2D digital views or images 1306.1-1306.5 of multiple different scenes S1-S5 and resulting layers 1308.1-1308.5, and the resultant layers 1406 of frames or layers 1308.1-1308.5 are sent to step 803 in the flow diagram of FIG. 8.

For example, a singular object within a scene S may be a football helmet generated as flat 2D image in scene S. This modality allows, for example, rounding to be assigned to the football helmet or a section of the football helmet.

Figure 15:
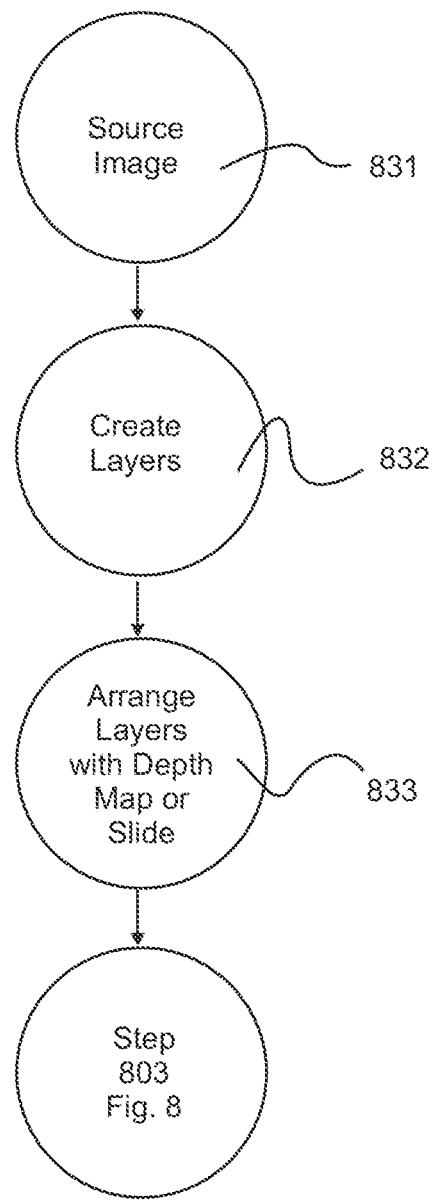
FIG. 15 is a diagram of the slider process in the photon platform.

As depicted in FIG. 15, the different scenes S1-S5 are input at step or block 831. The scenes S1-S5 are masked into different layers at step or block 832. The layers are adjusted at step or block 833 using the slider program 1201 as shown in FIG. 14. The adjusted layers are inputted into 803 of FIG. 8. The program flow as depicted in FIG. 8 is then followed to produce an output master 808 of FIG. 8 or 303 of FIG. 4. The resultant master image may then be viewed on an appropriate device, view image 804 or a hardcopy printed using the appropriate MOM lens system.

The foregoing description and drawings comprise illustrative embodiments of the present disclosure. Having thus described exemplary embodiments, it should be noted by those of ordinary skill in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail; it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

What is claimed is:

1. A method for generating a multidimensional master digital image from at least one two dimensional digital source image, the method utilizing a computer processor executing an instruction, said method comprising:
    inputting at least one two dimensional digital source image of at least one scene to said processor;
    based on said at least one two dimensional digital source image, providing at least one left digital image and at least one right digital image;
    selecting a closest point in each of said left and right digital images and assigning said closest point a gray scale value of a start number;
    selecting a furthest point in each of said left and right digital images and assigning said furthest point a gray scale value of an end number;
    selecting a key subject point in each of said left and right digital images and assigning said key subject point a gray scale value of an intermediate number;
    inputting a number of gray scale digital image layers of said left and right digital images to be utilized in generating the multidimensional master digital image;
    generating from at least said assigned gray scale values a depth map having said number of gray scale digital image layers, including a layer for at least each of said closest point, said key subject point and said furthest point;
    inputting a calculated range of a set of useable parallax values in said gray scale digital image layers, said calculated range including at least a minimum parallax value and at least a maximum parallax value, said set of useable parallax values being based on a gray scale image layer number and at least one other digital image parameter;
    configuring said gray scale digital image layers such that (1) each of said key subject points therein is aligned, (2) the parallax value in said key subject point's gray scale digital image layer is zero, and (3) the parallax value in each of the other said gray scale digital image layers is within said calculated range of said useable parallax values;
    interphasing columns of pixels of said gray scale digital image layers to generate a multidimensional master digital image of said at least one scene aligned to said key subject point and;
    wherein said minimum parallax value is calculated based on said gray scale image layer number and a resolution of said at least one two dimensional digital source image.

2. The method of claim 1, wherein:
    said multidimensional master digital image is configured to be viewed through a lenticular screen; and
    said maximum parallax value is calculated based on said gray scale image layer number and a lenticule width of a viewing screen.

3. The method of claim 1, wherein:
    said multidimensional master digital image is configured to be viewed through a non-lenticular viewing screen; and
    said maximum parallax value is calculated based on said gray scale image layer number and a barrier pitch width of the non-lenticular viewing screen.

4. The method of claim 1, further comprising inputting at least one calculated intermediate parallax value between said minimum parallax value and said maximum parallax value;
    said number of gray scale digital image layers generated includes at least one foreground layer between said closest point and said key subject point and at least one background layer between said furthest point and said key subject point; and
    said at least one foreground layer and said at least one background layer are configured to have said useable parallax values equal to at least one of said intermediate parallax value and said minimum parallax value.

5. The method of claim 4, wherein said intermediate parallax value is an even multiple of said minimum parallax value.

6. The method of claim 1, wherein:
    said multidimensional master digital image is configured to be viewed through a viewing screen;
    said calculated range of a set of useable parallax values further includes a theoretical maximum parallax value calculated to optimize an optical characteristic of said viewing screen; and
    said maximum parallax value is greater than said theoretical maximum parallax value.

7. The method of claim 6, wherein said maximum parallax value is an even multiple of said theoretical maximum parallax value.

8. The method of claim 1, further comprising:
    inputting a plurality of two dimensional digital source images to said processor;
    providing a plurality of digital images corresponding to said plurality of two dimensional digital source images;
    selecting said closest point, said furthest point and said key subject point in each of said corresponding plurality of digital images and assigning thereto said gray scale start number, said gray scale end number and said gray scale intermediate number, respectively;
    inputting a number of gray scale digital image layers of said corresponding plurality of digital images to be utilized in generating the multidimensional master digital image;
    displaying said at least one left digital image and said at least one right digital image on a viewing screen; and wherein a closest point, a furthest point and a key subject point are selected by interaction with said viewing screen; and wherein said gray scale value assigned to said key subject point is proximate to a midpoint between said gray scale start number and said gray scale end number.

9. The computer system of claim 8, wherein said gray scale value assigned to said key subject point is proximate to a midpoint between said gray scale start number and said gray scale end number.

10. The method of claim 1, further comprises positioning a key subject point image layer proximate to a midpoint between a closest point image layer and a furthest point image layer, wherein said key subject point image layer is positioned within a plus or minus fifteen percent adjustment from said midpoint.

11. The method of claim 1, further comprising the step of: printing said multidimensional master digital image on micro-optical material; and
   calculating a parallax adjustment for resetting said maximum parallax value for pitch resize distortion of said printed multidimensional master digital image.

12. A computer system to generating a multidimensional master digital image from at least one two dimensional digital source image, the computer system comprising:
   a memory device for storing an instruction;
   a processor in communication with said memory and configured to execute said instruction:
   said processor receives at least one two dimensional digital source image of at least one scene;
   said processor converts said digital source image to at least one left digital image and at least one right digital image;
   said processor displays said at least one left digital image and said at least one right digital image on a viewing screen;
   said processor executes an instruction to select a closest point in each of said left and right digital images and assign said closest point a gray scale value of a start number;
   selecting a furthest point in each of said left and right digital images and assign said furthest point a gray scale value of an end number;
   said processor executes an instruction to select a key subject point in each of said left and right digital images and assign said key subject point a gray scale value of an intermediate number;
   said processor executes an instruction to input a number of gray scale digital image layers of said left and right digital images to be utilized to generate the multidimensional master digital image;
   said processor executes an instruction to generate from at least said assigned gray scale values a depth map having said number of gray scale digital image layers, including a layer for at least each of said closest point, said key subject point and said furthest point;
   said processor executes an instruction to input a calculated range of a set of useable parallax values in said gray scale digital image layers, said calculated range including at least a minimum parallax value and at least a maximum parallax value, said set of useable parallax values being based on a gray scale image layer number and at least one other digital image parameter;
   said processor executes an instruction to configure said gray scale digital image layers such that (1) each of said gray scale key subject points therein is aligned, (2) the parallax value in said key subject point's gray scale digital image layer is zero, and (3) the parallax value in each of the other said gray scale digital image layers is within said calculated range of said useable parallax values;
   said processor executes an instruction to interphase columns of pixels of said gray scale digital image layers to generate a multidimensional master digital image of said at least one scene aligned to said key subject point; and
   wherein said minimum parallax value is calculated based on said gray scale image layer number and a resolution of said at least one two dimensional digital source image.

13. The computer system of claim 12, wherein said minimum parallax value is calculated based on said gray scale image layer number and a resolution of said at least one two dimensional digital source image.

14. The computer system of claim 12, wherein
   said multidimensional master digital image is configured to be viewed through a lenticular screen; and
   said maximum parallax value is calculated based on said gray scale image layer number and a lenticule width of a viewing screen.

15. The computer system of claim 12, wherein:
   said multidimensional master digital image is configured to be viewed through a non-lenticular viewing screen; and
   said maximum parallax value is calculated based on said gray scale image layer number and a barrier pitch width of the non-lenticular viewing screen.

16. The computer system of claim 12, wherein said processor executes an instruction to input at least one calculated intermediate parallax value between said minimum parallax value and said maximum parallax value; and
   wherein said number of gray scale digital image layers generated includes at least one foreground layer between said closest point and said key subject point and at least one background layer between said furthest point and said key subject point; and
   said at least one foreground layer and said at least one background layer are configured to have said useable parallax values equal to at least one of said intermediate parallax value and said minimum parallax value.

17. The computer system of claim 16, wherein said intermediate parallax value is an even multiple of said minimum parallax value.

18. The computer system of claim 12, wherein
   said multidimensional master digital image is configured to be viewed through a viewing screen;
   said calculated range of a set of useable parallax values further includes a theoretical maximum parallax value calculated to optimize an optical characteristic of said viewing screen; and
   said maximum parallax value is greater than said theoretical maximum parallax value.

19. The computer system of claim 18, wherein said maximum parallax value is an even multiple of said theoretical maximum parallax value.

20. The computer system of claim 12, wherein said processor executes an instruction to position a key subject point image layer proximate to a midpoint between a closest point image layer and a furthest point image layer;
   wherein said key subject point image layer is positioned within a plus or minus fifteen percent adjustment from said midpoint.

21. The computer system of claim 12, wherein said processor executes an instruction to print said multidimensional master digital image on micro-optical material, wherein said processor executes an instruction to calculate a parallax adjustment for resetting said maximum parallax value for pitch resize distortion of said printed multidimensional master digital image.

\* \* \* \* \*